United States Patent [19]
Tabata et al.

[11] Patent Number: 5,951,614
[45] Date of Patent: Sep. 14, 1999

[54] VEHICLE HYBRID DRIVE SYSTEM CONTROL APPARATUS ADAPTED TO REDUCE TRANSMISSION INPUT TORQUE UPON TRANSMISSION SHIFTING, BY USING ENGINE AND/OR MOTOR/GENERATOR

[75] Inventors: Atsushi Tabata, Okazaki; Yutaka Taga, Aichi-ken; Ryuji Ibaraki, Toyota; Hiroshi Hata, Toyota; Tsuyoshi Mikami, Toyota, all of Japan

[73] Assignee: Toyota Jidosha Kabushiki Kaisha, Toyota, Japan

[21] Appl. No.: 08/868,753

[22] Filed: Jun. 5, 1997

[30] Foreign Application Priority Data

Jun. 11, 1996 [JP] Japan .................................. 8-149490

[51] Int. Cl.$^6$ ...................................................... B60L 11/14
[52] U.S. Cl. .............................. 701/54; 701/22; 701/59; 180/65.2
[58] Field of Search .................................. 701/22, 53, 54, 701/56, 59; 180/65.2; 477/2, 3, 102, 115

[56] References Cited

U.S. PATENT DOCUMENTS

| | | | |
|---|---|---|---|
| 5,669,849 | 9/1997 | Tabata et al. | 477/102 |
| 5,713,425 | 2/1998 | Buschhaus et al. | 180/65.2 |
| 5,839,533 | 11/1998 | Mikami et al. | 180/165 |
| 5,856,709 | 1/1999 | Ibaraki et al. | 290/45 |

FOREIGN PATENT DOCUMENTS

| | | |
|---|---|---|
| B-5-10249 | 2/1983 | Japan . |
| A-63-212137 | 9/1988 | Japan . |
| A-63-291738 | 11/1988 | Japan . |
| A-1-150050 | 6/1989 | Japan . |
| A-2-3545 | 1/1990 | Japan . |
| A-3-37470 | 2/1991 | Japan . |
| B-5-13858 | 2/1993 | Japan . |
| A-6-319210 | 11/1994 | Japan . |

*Primary Examiner*—Michael Zanelli
*Attorney, Agent, or Firm*—Oliff & Berridge, PLC

[57] ABSTRACT

Apparatus for controlling a vehicle hybrid drive system having a transmission disposed between a vehicle drive wheel and an assembly of an engine and a motor/generator, the apparatus including a torque reduction control device for reducing an input torque of the transmission during a shifting action of the transmission, wherein the torque reduction control device includes a first torque reducing device for reducing the input torque by controlling the engine, a second torque reducing device for reducing the input torque by controlling the motor/generator, and a torque reduction mode selecting device for enabling the first torque reducing device and/or the second torque reducing device to operate to reduce the input torque, according to a predetermined selecting condition.

16 Claims, 21 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | | | | | −4.550 |
| DRIVE | 1st | ○ | ○ | | | | | | ○ | ○ | | | 3.357 |
| | 2nd | ● | ○ | | | | | | ● | ○ | | ○ | 2.180 |
| | 3rd | ○ | ○ | | | ● | | ○ | | ○ | | | 1.424 |
| | 4th | ○ | ○ | ○ | | | ○ | | | ○ | ○ | | 1.000 |
| | 5th | | ○ | ○ | ○ | | ○ | | | | | | 0.753 |

FIG. 7

| MODE | CLUTCHES | | ENGINE 12 | STORAGE DEVICE 58 | MODE NOMENCLATURE |
| --- | --- | --- | --- | --- | --- |
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | OFF | CHARGED | VEHICLE START BY ENGINE |
| 6 | OFF | ON | ON | CHARGED | REGENERATIVE BRAKING |
| 7 | ON | OFF | OFF | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

FIG. 17

LEARNING COMPENSATING DATA MAPS

| TYPE OF LEARNING COMPENSATION \ TORQUE REDUCTION % | ~10% | 10~20 | 20~30 | 30~40 | 40%~ |
|---|---|---|---|---|---|
| SC8 | $\Delta P_{SLUA1}$ | $\Delta P_{SLUA2}$ | $\Delta P_{SLUA3}$ | $\Delta P_{SLUA4}$ | $\Delta P_{SLUA5}$ |
| SC12 | $\Delta P_{SLUB1}$ | $\Delta P_{SLUB2}$ | $\Delta P_{SLUB3}$ | $\Delta P_{SLUB4}$ | $\Delta P_{SLUB5}$ |
| SC16 | $\Delta P_{SLUC1}$ | $\Delta P_{SLUC2}$ | $\Delta P_{SLUC3}$ | $\Delta P_{SLUC4}$ | $\Delta P_{SLUC5}$ |
| SC20 | $\Delta P_{SLUD1}$ | $\Delta P_{SLUD2}$ | $\Delta P_{SLUD3}$ | $\Delta P_{SLUD4}$ | $\Delta P_{SLUD5}$ |

FIG. 19

LEARNING COMPENSATION DATA MAP A

| SHIFT-UP ACTIONS / INPUT TORQUE | 1→2 | 2→3 | 3→4 | 4→5 |
|---|---|---|---|---|
| $T_{I1}$ | $\Delta P_{A12T1}$ | $\Delta P_{A23T1}$ | $\Delta P_{A34T1}$ | $\Delta P_{A45T1}$ |
| $T_{I2}$ | $\Delta P_{A12T2}$ | $\Delta P_{A23T2}$ | $\Delta P_{A34T2}$ | $\Delta P_{A45T2}$ |
| $T_{I3}$ | $\Delta P_{A12T3}$ | $\Delta P_{A23T3}$ | $\Delta P_{A34T3}$ | $\Delta P_{A45T3}$ |
| $T_{I4}$ | $\Delta P_{A12T4}$ | $\Delta P_{A23T4}$ | $\Delta P_{A34T4}$ | $\Delta P_{A45T4}$ |
| ... | ... | ... | ... | ... |
| $T_{I8}$ | $\Delta P_{A12T8}$ | $\Delta P_{A23T8}$ | $\Delta P_{A34T8}$ | $\Delta P_{A45T8}$ |

FIG. 21

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | C₁ | C₂ | B₁ | B₂ | B₃ | B₄ | F₁ | F₂ | |
| NEUTRAL | N | | | | | | | | | — |
| REVERSE | Rev | | ○ | | | | ○ | | | −4.550 |
| DRIVE | 1st | ○ | | | | | ● | | ○ | 3.357 |
| | 2nd | ○ | | | | ○ | | | | 2.180 |
| | 3rd | ○ | | ● | ○ | | | ○ | | 1.424 |
| | 4th | ○ | ○ | | ○ | | | | | 1.000 |

VEHICLE HYBRID DRIVE SYSTEM CONTROL APPARATUS ADAPTED TO REDUCE TRANSMISSION INPUT TORQUE UPON TRANSMISSION SHIFTING, BY USING ENGINE AND/OR MOTOR/GENERATOR

This application is based on Japanese Patent Application No. 8-149490 filed Jun. 11, 1996, the content of which is incorporated hereinto by reference.

BACKGROUND OF THE INVENTION

1. Field of the Invention

The present invention relates in general to an apparatus for controlling a hybrid drive system of a motor vehicle, and more particularly to a technique for reducing an input torque of a transmission in such a hybrid drive system under a predetermined condition.

2. Discussion of the Related Art

There is known a hybrid drive system of a motor vehicle including (a) an engine operated by combustion of a fuel, (b) a motor/generator, (c) a transmission disposed between an assembly of the engine and the motor/generator and a drive wheel of the vehicle and having a variable speed ratio, and torque reduction control means for reducing the input torque of the transmission upon a shifting action of the transmission, under a predetermined condition. An example of such a hybrid drive system is disclosed in JP-A-6-319210, wherein the input torque of the transmission is temporarily reduced by controlling the torque of the motor/generator (electric motor), during a shifting action of the transmission under a predetermined condition, for instance, during an inertia phase of a shift-up action of the transmission while an accelerator pedal is in a depressed state.

However, the technique for reducing the input torque of the transmission by controlling the torque of the motor/generator is not necessarily satisfactory. For example, the reduction of the input torque is not possible when the amount of electric energy stored in an electric energy storage device for the motor/generator is not sufficient.

SUMMARY OF THE INVENTION

It is therefore an object of the present invention to provide an apparatus for controlling a hybrid drive system of a motor vehicle including a transmission disposed between an assembly of an engine and a motor/generator and a drive wheel, which apparatus permits suitable control of the input torque of the transmission under various running conditions of the vehicle.

The above object may be achieved according to the principle of the present invention, which provides an apparatus for controlling a hybrid drive system of a motor vehicle having an engine operated by combustion of a fuel, a motor/generator, and a transmission disposed between a drive wheel of the vehicle and an assembly of the engine and the motor/generator, the apparatus comprising torque reduction control means for reducing an input torque of the transmission during a shifting action of the transmission, when a predetermined torque reducing condition is satisfied, the apparatus being characterized in that the torque reduction control means comprises: (a) first torque reducing means for reducing the input torque of the transmission by controlling the engine; (b) second torque reducing means for reducing the input torque of the transmission by controlling the motor/generator; and (c) torque reduction mode selecting means for enabling at least one of the first and second torque reducing means to operate to reduce the input torque, according to a predetermined selecting condition.

In the vehicle hybrid drive system control apparatus of the present invention constructed as described above, the torque reduction control means includes the first torque reducing means for reducing the input torque of the transmission by using the engine, the second torque reducing means for reducing the input torque of the transmission by using the motor/generator, and the torque reduction mode selecting means for enabling at least one of the first and second torque reducing means, according to the predetermined selecting condition. The present control apparatus permits adequate reduction of the input torque of the transmission over a wider range of running conditions of the vehicle, than the conventional control apparatus in which only the motor/generator is used for reducing the input torque of the transmission.

The hybrid drive system controlled by the present control apparatus may be a drive system of any hybrid type including an engine and a motor/generator as a drive power source, and a transmission disposed between the drive power source and the drive wheel of the vehicle. Typical types of hybrid drive system to which the present invention is applicable include: a type using clutches which are selectively engaged and released for connecting and disconnecting power transmitting paths to thereby select at least one of the engine and the motor/generator as the drive power source; a type incorporating a planetary gear device or any synthesizing/distributing mechanism for synthesizing and distributing outputs of the engine and motor/generator; a type using one of the motor/generator (electric motor) and the engine as an auxiliary drive power source which assists the other acting as a primary drive power source; and a type wherein the motor/generator (electric motor) is always used as the drive power source while the engine is used to generate an electric energy used by the motor/generator.

The hybrid drive system preferably has a plurality of operation modes in which at least one of the engine and the motor/generator is operated as the drive power source. The operation modes may include an engine drive mode in which the engine is operated as the drive power source for running the vehicle, a motor drive mode in which the motor/generator is operated as the drive power source, and an engine.motor drive mode in which both the engine and the motor/generator are operated as the drive power source. A suitable one of these operation modes of the hybrid drive system is automatically selected on the basis of the currently required output of the vehicle (as represented by the operating amount of an accelerator pedal, a load acting on the vehicle, or a parameter equivalent thereof), and the running speed of the vehicle.

The term "motor/generator" used herein is interpreted to mean a device which functions at least one of an electric motor and an electric generator (dynamo), and may be operated selectively as the electric motor and the electric generator depending upon the running condition of the vehicle. Where the motor/generator is always used as the drive power source, the motor/generator may be provided for each of a plurality of drive wheels of the vehicle.

The transmission provided in the hybrid drive system may be an automatic transmission whose speed ratio is automatically changed according to predetermined shift patterns, or a manual transmission having different speed ratios that are selectively established by an operator of the vehicle. The automatic transmission may be a planetary gear type or parallel two-axes type having a plurality of operating positions having respective speed ratios, which are selectively established by selective engagement and disengagement of suitable coupling means such as hydraulically operated frictional coupling devices or positive clutches. Alternatively, the automatic transmission may be a continuously variable transmission of belt-and-pulley type or toroidal type whose speed ratio is continuously variable. The manual transmission may be shifted by electric actuators according to manipulation of switches or a shift lever by the vehicle operator. The shift patterns used for the automatic transmission having different speed ratios are preferably shift patterns which include the vehicle running speed and the operating amount of the accelerator pedal, as the parameters for selecting one of the speed ratios.

In one preferred form of the control apparatus of this invention, the torque reduction control means is adapted to reduce the input torque of the transmission during an inertia phase of a shift-up action as the shifting action of the transmission.

In another preferred form of the control apparatus, the torque reduction control means is adapted to reduce the input torque of the transmission during a shift-down action as the shifting action of the transmission.

In a further preferred form of the control apparatus, the torque reduction control means is adapted to reduce the input torque of the transmission upon occurrence of an overshoot of an input speed of the transmission during a clutch-to-clutch shifting action of the transmission which is effected by engaging one of two coupling devices while releasing the other of the two coupling devices.

However, the input torque of the transmission may be reduced in any other suitable condition, or in any event other than a shifting action of the transmission, for example, upon operation of a shift lever from a non-drive position (N) such as a neutral position to a forward drive position (D).

In a still further preferred form of the apparatus, the first torque reducing means is adapted to reduce the input torque of the transmission by effecting a retard control of spark advance of the engine to thereby reduce a torque of the engine. However, the first torque reducing means may be adapted to reduce the input torque of the transmission by reducing the opening angle of a throttle valve of the engine to thereby reduce the engine torque. In these cases, the transmission input torque can be reduced by reducing the engine torque when the hybrid drive system is placed in the engine drive mode or engine.motor drive mode indicated above.

In a yet further preferred form of this invention, the second torque reducing means is adapted to reduce the input torque of the transmission by reducing a forward rotation torque of the motor/generator or giving a reverse rotation torque or a regenerative braking torque to the motor/generator. In this case, the transmission input torque can be reduced by controlling the motor/generator, not only in the motor drive mode, but also in the engine drive and engine.motor drive modes. In the hybrid drive system including an electrically controlled torque converter adapted to cause the output of the engine to be transmitted to the transmission with the motor/generator bearing a reaction force, the input torque of the transmission can be reduced by reducing the reaction torque of the motor/generator to thereby reduce its output torque.

In still another preferred form of the invention, the torque reduction mode selecting means is adapted to enable one of the first torque reducing means and the second torque reducing means to operate, according to the predetermined selecting condition.

In an alternative preferred form of the invention, the torque reduction mode selecting means is adapted to select one of a first torque reduction mode wherein the first torque reducing means is enabled to operate, a second torque reduction mode wherein the second torque reducing means is enabled to operate, and a third torque reduction mode in which the first and second torque reducing means are enabled to operate.

In a further preferred form of the present invention, the torque reduction mode selecting means is adapted to determine whether each of the engine and the motor/generator is operable to reduce the input torque of the transmission, and selects at least one of the first and second torque reducing means to be enabled to operate, depending upon whether each of the engine and the motor/generator is operable.

In the above preferred form of the apparatus, the engine is controlled to reduce the input torque of the transmission when the motor/generator is not operable due to an insufficient amount of electric energy stored in an electric energy storage device (e.g., a battery), for example. When the engine is not operable with the temperature of a catalyst being lower than a lower limit, on the other hand, the motor/generator is controlled to reduce the input torque of the transmission. Thus, the input torque of the transmission can be suitably reduced, even when one of the engine and the motor/generator is not operable as a source for reducing the transmission input torque.

In one advantageous arrangement of the above preferred form of the apparatus, the torque reduction mode selecting means is adapted to determine whether the motor/generator is operable to reduce the input torque of the transmission, and the torque reduction mode selecting means is adapted to enable the second torque reducing means when the motor/generator is operable, and enabling the first torque reducing means when the motor/generator is not operable.

If the engine and the motor/generator are both inoperable as the source for reducing the input torque of the transmission, it is desirable to change a shift pattern used for determining whether the shifting action should take place, or to increase the pressure of a coupling device which is engaged to achieve the shifting action. Where the shift pattern is changed, the shift pattern is changed from a normally used shift pattern to a shift pattern which causes the shifting action of the transmission to take place at a lower vehicle running speed than usual. The change of the shift pattern or the increase of the pressure of the coupling device is effective to reduce the load of the coupling device.

Further, the pressure of the coupling device engaged to achieve the shifting action in question of the transmission may be reduced during an operation to reduce the input torque of the transmission. In this case, the pressure of the coupling device is reduced by an amount corresponding to the amount of reduction of the transmission input torque.

In a still further preferred form of this invention, the torque reduction control means is adapted to determine an amount of reduction of the input torque of the transmission depending upon operating states of the engine and the motor/generator.

In the above preferred form of the invention, the amount of reduction of the transmission input torque can be adequately determined depending upon the specific inertia of the drive power source, that is, the inertia of the engine used as the drive power source in the engine drive mode, the inertia of the motor/generator used as the drive power source in the motor drive mode, or the total inertia of the engine and the motor/generator used as the drive power source in the engine.motor drive mode. Thus, the present apparatus assures the reduction of the transmission input torque with higher accuracy. In this respect, a difference in the inertia of the drive power source used may cause a shifting shock of the transmission if the input torque of the transmission is reduced by the same amount.

In one advantageous arrangement of the above preferred form of the invention, the torque reduction control means is adapted to determine the amount of reduction of the input torque depending upon a currently established one of operation modes of the hybrid drive system. For instance, the operation modes include a motor drive mode in which the motor/generator is operated as a drive power source for driving the motor vehicle, an engine drive mode in which the engine is operated as the drive power source, and an engine.motor drive mode in which both the engine and the motor/generator are operated as the drive power source.

The amount of reduction of the transmission input torque is desirably determined by parameters other than the operating states of the engine and the motor/generator. Such parameters include the torque of the engine or the motor/generator before the reduction of the transmission input torque, and the kind of the shifting action of the transmission.

In a yet further preferred form of the present invention, the control apparatus further comprises learning compensation means for effecting learning compensation of a physical value which influences the shifting action of the transmission, the learning compensation means being provided for each of a plurality of torque reduction modes at least one of which is selected by the torque reduction mode selecting means according to the predetermined selecting condition, to enable at least one of the first and second torque reducing means to operate to reduce the input torque of the transmission.

The above preferred form of the apparatus permits the shifting action of the transmission to take place with a higher degree of stability, since the physical value influencing the shifting action is determining by learning compensation by one of the plurality of learning compensation means which corresponds to the torque reduction mode wherein the transmission input torque is reduced. With the same amount of reduction of the transmission torque amount, the control accuracy and response of the first torque reducing means which uses the engine to reduce the transmission input torque are different from those of the second torque reducing means which uses the motor/generator to reduce the transmission input torque. Therefore, the physical value determined by the learning compensation in the same manner regardless of the specific torque reduction mode does not permit adequate control of the shifting action of the transmission.

In one advantageous arrangement of the above preferred form of the apparatus, the physical value consists of a hydraulic pressure applied to a coupling device for achieving the shifting action of the transmission, and the learning compensation means is adapted to determine the hydraulic pressure as the physical value by learning compensation.

In the above advantageous arrangement, the torque reduction control means may be adapted to control an amount of reduction of the input torque of the transmission in a feedback fashion such that the shifting action is performed so as to meet a predetermined condition. In this case, the learning compensation means is adapted to effect learning compensation of the hydraulic pressure on the basis of the amount of reduction of the input torque by feedback control by the torque reduction control means.

In another advantageous arrangement of the above preferred form of the apparatus, the plurality of torque reduction modes consist of a first torque reduction mode wherein the first torque reducing means is enabled to operate, a second torque reduction mode wherein the second torque reducing means is enabled to operate, and a third torque reduction mode in which the first and second torque reducing means are enabled to operate.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which:

FIG. 3 is a view indicating operating states of various coupling elements for establishing different operating positions of an automatic transmission in the hybrid drive system of FIG. 1;

FIG. 7 is a view indicating nine operating modes which are selectively established in the sub-routine of FIG. 6;

FIG. 17 is a view indicating an example of a data map for learning compensation of hydraulic pressure $P_{SLU}$ to be applied to linear solenoid valve SLU for the automatic transmission, in the embodiment of FIG. 15;

FIG. 19 is a view indicating an example of a data map which is updated by learning compensation in the control routine of FIG. 18;

FIG. 21 is a view indicating operating states of coupling elements for establishing operating positions of an automatic transmission in the hybrid drive system of FIG. 20.

DETAILED DESCRIPTION OF THE PREFERRED EMBODIMENTS

Figure 1:
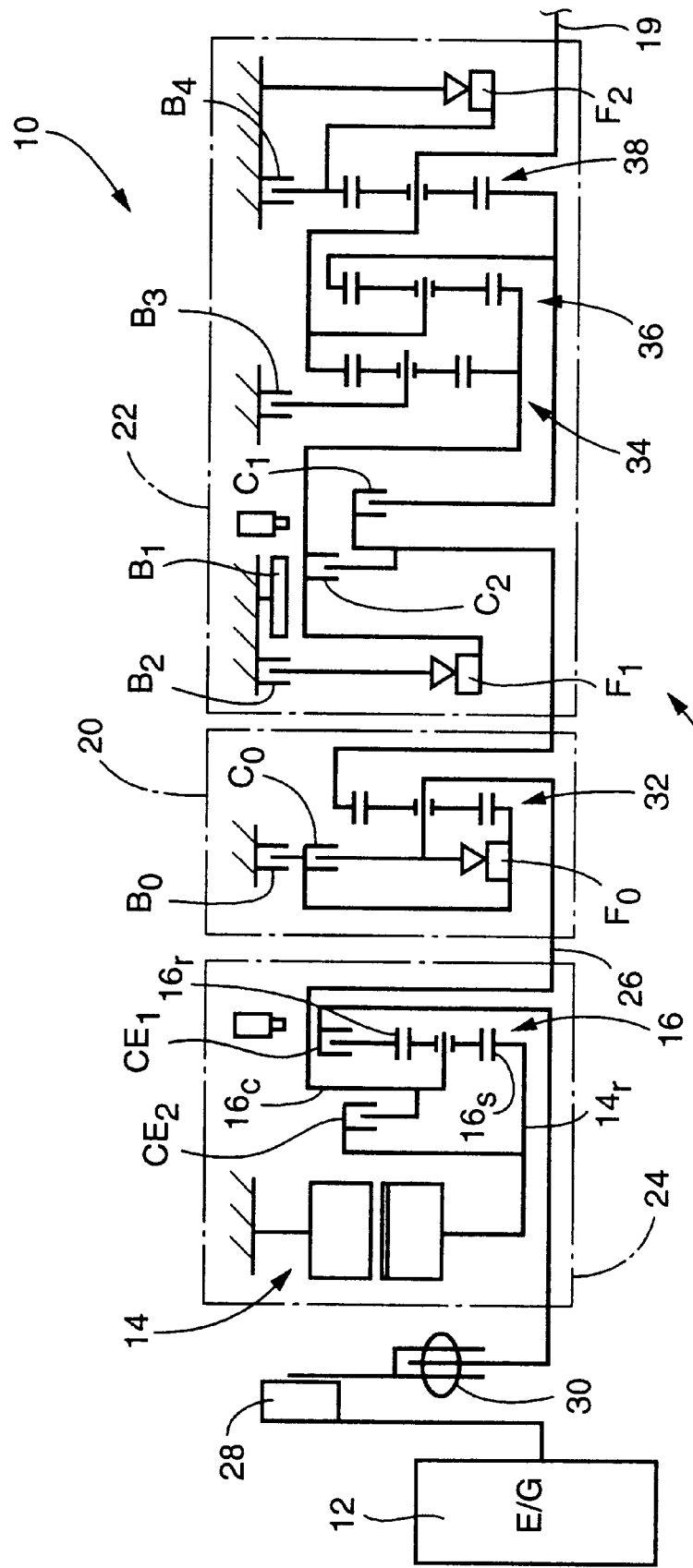
FIG. 1 is a schematic view illustrating a general arrangement of a hybrid drive system of a motor vehicle equipped with a control apparatus constructed according to a first embodiment of the present invention.

Referring first to the schematic view of FIG. 1, there is shown a hybrid drive system 10 adapted for use on a front-engine rear-drive motor vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The auxiliary transmission 20 includes frictionally coupling clutch C0 and brake B0 operated by respective hydraulic actuators, and a one-way clutch F0.

The primary transmission 22 frictionally coupling clutches C1, C2 and brakes B1, B2, B3, B4 which are operated by respective hydraulic actuators, and one-way clutches F1, F2.

Figure 2:
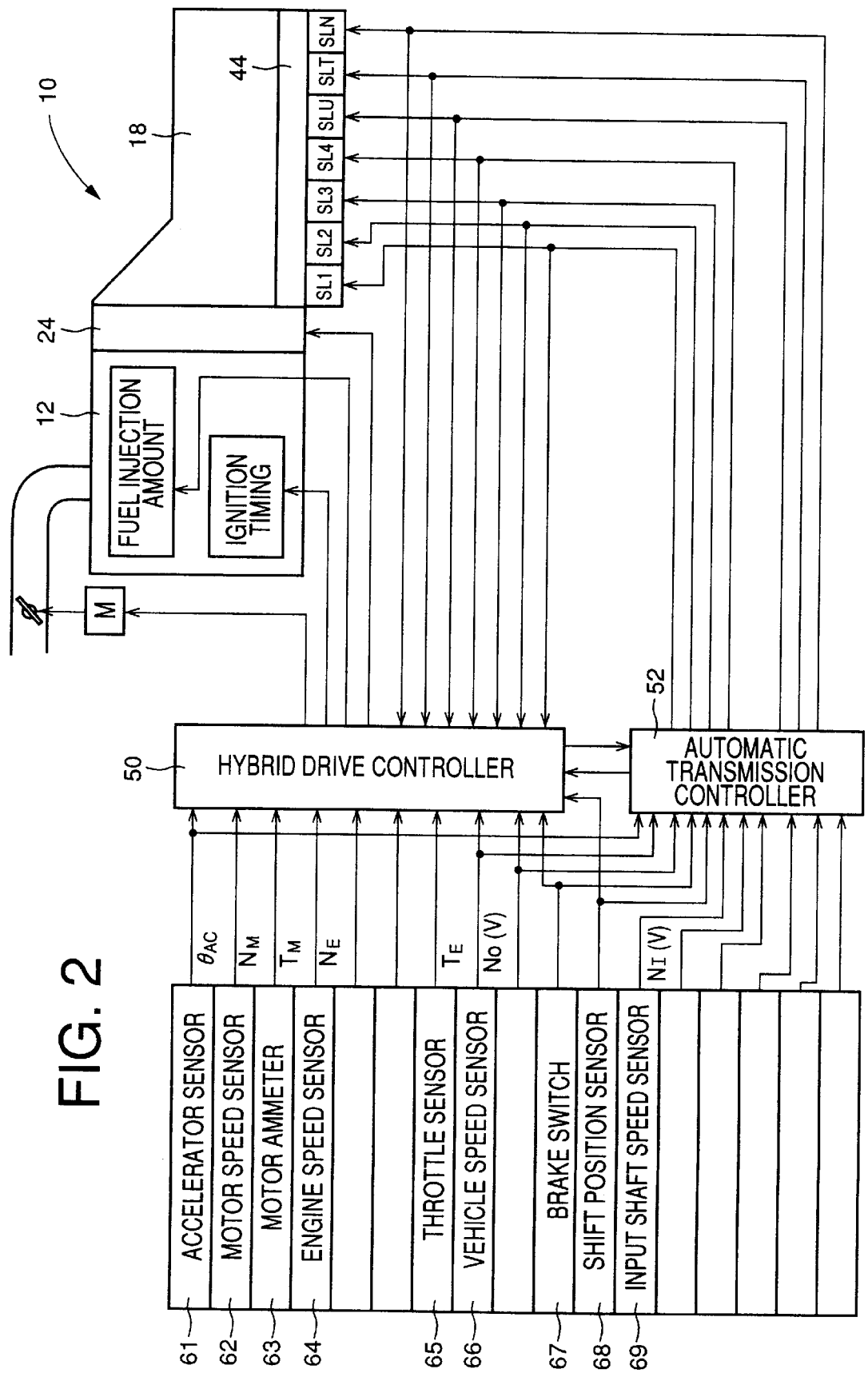
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve which is mechanically connected to and operated by a shift lever. The clutches C0–C2 and brakes B0–B4 are controlled by the solenoid-operated valves SL1–SL4 and the manual shift valve. The shift lever has a parking position "P", a neutral position "N", a reverse position "R", a drive position "D", and engine braking positions such as a third-speed position "3", a second speed position "2" and a low-speed position "L".

Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The neutral and rear-drive positions "N", "Rev" of the automatic transmission 18 are established by the manual shift valve mechanically connected to the shift lever. When the shift lever is placed in any one of the engine braking positions, the transmission 18 is automatically shifted by the manual shift valve. When the shift lever 240 is placed in the drive position "D", the automatic transmission 18 is it automatically placed in an appropriate one of the five forward-drive positions "1st" through "5th", with the solenoids of the solenoid-operated valves SL1–SL4 being selectively energized depending upon the running condition of the vehicle.

The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1. The speed ratios of the rear-drive and forward-drive positions of the automatic transmission 18 are indicated in the table of FIG. 3, for illustrative purpose only.

The hydraulic control device 44 is constructed as described below by reference to FIG. 4.

Figure 4:
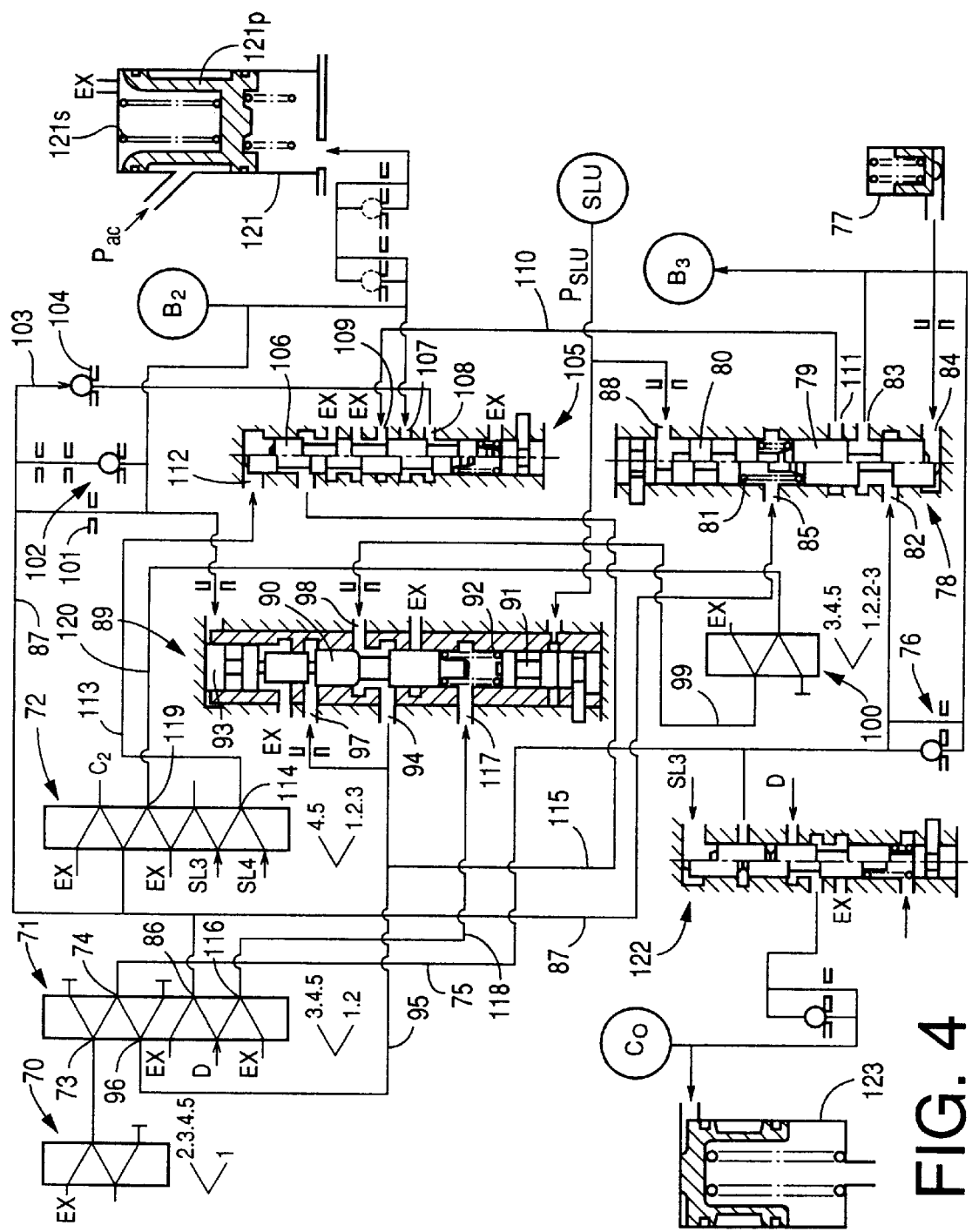
FIG. 4 is a view showing a part of a hydraulic system of the automatic transmission in the hybrid drive system of FIG. 1.

In FIG. 4, reference numerals 70, 71 and 72 denote a 1-2 shift valve, a 2-3 shift valve and a 3-4 shift valve, respectively. Working fluid communications of ports of these shift valves 70, 71, 72 are indicated below the shift valves as shown in FIG. 4 in which the five forward-drive positions "1st", "2nd", "3rd", "4th" and "5th" are represented as "1", "2", "3", "4" and "5", respectively.

The 2-3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 4 denotes a B-3 control valve which is provided to regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 79 is disposed. The 2-3 shift valve 71 has a port 86 which produces a hydraulic pressure output (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 4 denotes a 2-3 timing valve which includes a spool 90, a first plunger 91, a spring 92 disposed between the spool 90 and the first plunger 91, and a second plunger 93 disposed on the side of the spool 90 remote from the first plunger 91. the spool 90 has a small-diameter land and two large-diameter lands having a larger diameter than the small-diameter land. The 2-3 timing valve 89 has a port 94 formed at an intermediate portion thereof. An oil passage 95 is connected to the port 94, and to a port 96 of the 2-3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2-3 timing valve 89, which port 97 is open between the above-indicated small-diameter land one of the two large-diameter lands of the spool 90. The 2-3 timing valve 89 further has a port 98 which is selectively communicable with the above-indicated port 94 and which is connected through an oil passage 99 to a solenoid relay valve 100.

The 2-3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 401 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 4. The above-indicated branch 103 of the oil passage 87 is connected to the port 108. The orifice control valve 105 further has a port 108 formed at a position above the port 107 as seen in FIG. 4.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3-4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2-3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 317 of the 2-3 timing valve 89 which is open to a chamber in which the spring 92 is disposed. The 3-4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 4 denotes an accumulator for the second brake B2. The accumulator 121 has a back-pressure chamber to which is applied an accumulator control pressure Pac which is regulated on the basis of a pilot pressure $P_{SLN}$ received from a linear solenoid valve SLN (FIG. 2). When the 2-3 shift valve 71 is operated to shift up the automatic transmission 18 from the second-speed position "2nd" to the third-speed position "3rd", the second brake B2 receives forward-drive pressure (line pressure PL)

from the port 86 through the oil passage 87, whereby a piston 121p of the accumulator 121 is moved up by this line pressure PL. While the piston 121p is moved up, the hydraulic pressure PB2 applied to the second brake B2 is raised to a substantially fixed level corresponding to a sum of the downward biasing force of a spring 121s and a force based on the accumulator control pressure Pac. Precisely explained, the above-indicated level gradually increases as the spring 121s is compressed. When the piston is moved to its upper end, the pressure becomes equal to the line pressure PL. That is, the transient pressure PB2 in the process of a 2-3 shift-up action of the automatic transmission 18 while the piston 121p is moved up is determined by the accumulator control pressure Pac.

The accumulator control pressure Pac which is applied to the accumulator 121 for engaging the second brake B2 to establish the third-speed position "3rd" of the automatic transmission 18 is also applied to the other accumulators, that is, the accumulator for the clutch C1 which is engaged to establish the first-speed position "1st", the accumulator for the clutch C2 which is engaged to establish the fourth-speed position "14th", and the accumulator for the brake B0 which is engaged to establish the fifth-speed position "5th", so that the transient pressures of those clutches C1, C2 and brake B0 are controlled by the accumulator control pressure Pac.

Reference numeral 122 in FIG. 4 denotes a C-0 exhaust valve, and reference numeral 123 denotes an accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

In the hydraulic control device 44 constructed as described above, the engaging pressures of the second and third brakes B2 and B3 are regulated on the basis of the torque of the input shaft 26, so as to effectively reduce a shifting shock of the automatic transmission 18, upon the 2-3 shift-up action from the second-speed position "2nd" to the third-speed position "3rd", that is, a so-called "clutch-to-clutch" shifting action which is established by engaging the second brake B2 while releasing the third brake B3. Further, the transient pressures of the clutches C1, C2 and brake B0 upon other shifting actions of the automatic transmission 18 can be suitably regulated by controlling the duty-ratio of the linear solenoid valve SLN to thereby regulate the accumulator control pressure Pac.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 61 for detecting an operating amount $\theta_{AC}$ of an accelerator pedal; a motor speed sensor 62 for detecting speed $N_M$ of the motor/generator 14; a motor ammeter 63 for detecting an electric current of the motor/generator 14, which indicates torque $T_M$ of the motor 14; an engine speed sensor 64 for detecting speed $N_E$ of the engine 12; a throttle sensor 65 for detecting the opening angle of a throttle valve, which indicates torque $T_E$ of the engine 12; a vehicle speed sensor 66 for detecting the rotating speed $N_O$ of the output shaft 19 of the automatic transmission 18, which indicates running speed V of the motor vehicle; a brake switch 67 for detecting an operation of a brake pedal; a shift position sensor 68 for detecting the currently selected position of the shift lever; and an input shaft speed sensor 69 for detecting the rotating speed $N_I$ of the input shaft 26 of the automatic transmission 18.

The hybrid drive controller 50 is adapted to control the opening angle of the throttle valve, and the fuel injection and ignition timing of the engine 12, so that the output of the engine 12 is controlled depending upon the specific running condition of the vehicle.

Figure 5:
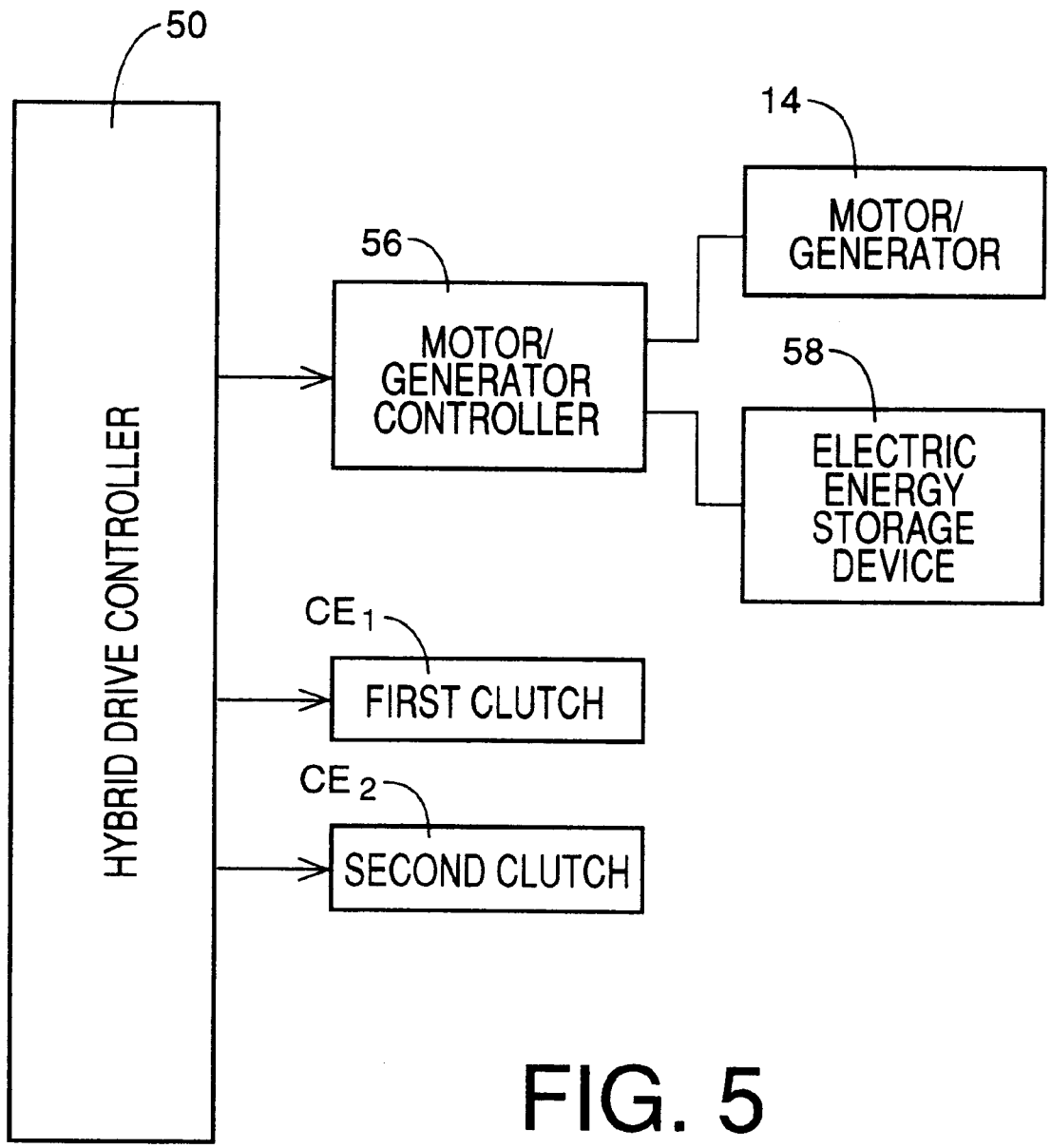
FIG. 5 is a block diagram showing connection between a hybrid drive controller and an electrically operated torque converter shown in FIG. 1.

The motor/generator 14 is connected to an electric energy storage device 58 through a motor/generator controller 56, as indicated in FIG. 5. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

The first and second clutches CE1, CE2 are controlled by the hybrid drive controllers 50 through solenoid-operated valves of the hydraulic circuit. The automatic transmission 18 is controlled by the automatic transmission controller 252 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns. Examples of the shift patterns are indicated by broken lines (a) and (b) in FIG. 10. The broken lines (a) and (b) are a shift-down boundary line and a shift-up boundary line for shifting down and up the automatic transmission 18 on the basis of the operation amount $\theta_{AC}$ of the accelerator pedal and the vehicle running speed V. The automatic transmission controller 50 functions as shift control means for controlling the shifting actions of the automatic transmission 18.

Figure 6:
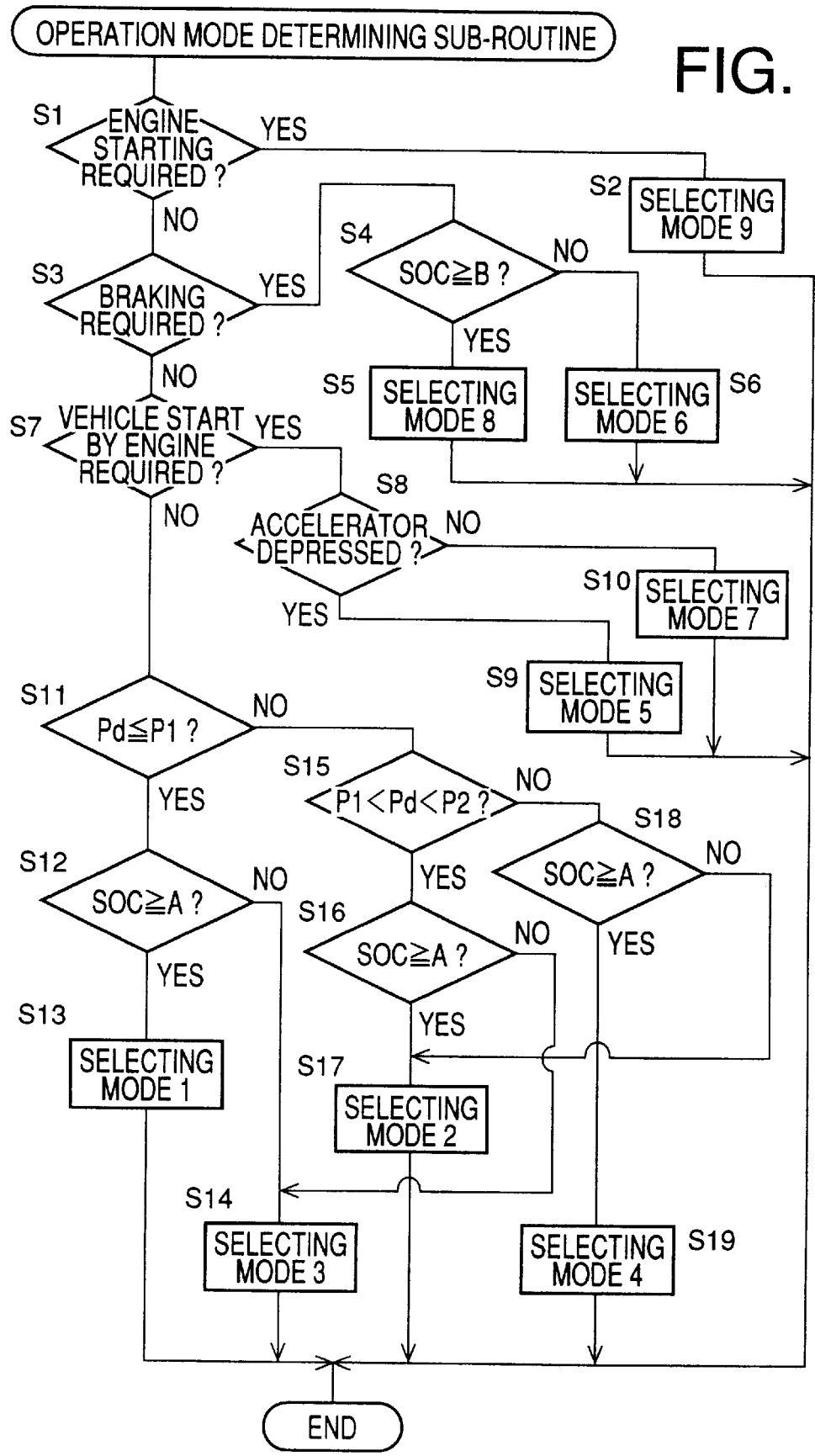
FIG. 6 is a flow chart illustrating an operation mode determining sub-routine executed by a hybrid drive controller of the hybrid drive system of FIG. 1.

The hybrid drive controller 50 is adapted to execute an operation mode determining sub-routine illustrated in the flow chart of FIG. 6, for selecting one of nine operation modes of the hybrid drive system 10 indicated in FIG. 7, and for operating the engine 12 and the electrically controlled torque converter 24 in the selected mode, as disclosed in U.S. patent application Ser. No. 08/746,483 filed Nov. 12, 1996, now U.S. Pat. No. 5,856,709. As shown in FIG. 2, the hybrid drive controller 50 is adapted to receive the output signals of the various sensors described above. The sub-routine of FIG. 6 executed by the hybrid drive controller 50 corresponds to mode selecting means for selecting one of the operation modes of the hybrid drive system 10.

The engine torque $T_E$ can be obtained from the opening of the throttle valve as detected by the throttle sensor 65, or from the amount of fuel injection into the engine 12. The motor torque $T_M$ can be obtained from the electric current of the motor/generator 14 as detected by the motor ammeter 265. An amount of electric energy SOC stored in the electric energy storage device 58 can be obtained from the electric current or charging efficiency of the motor/generator 14 when it is operated as the electric generator to charge the storage device 58.

The operation mode determining sub-routine of FIG. 6 is initiated with step S1 to determine whether there exists a command requiring the engine 12 to be started, for driving the vehicle with the engine 12 used as the drive power source or for operating the motor/generator 14 for charging the electric energy storage device 58.

If an affirmative decision (YES) is obtained in step S1, the control flow goes to step S2 to select an operation mode 9. In this operation mode 9, the first and second clutches CE1, CE2 are both engaged (turned ON) as indicated in the table of FIG. 7, and the motor/generator 14 is operated to start the engine 12 through the planetary gear device 16, with the fuel injection amount and other conditions of the engine 10 being suitably controlled.

When this operation mode 9 is selected while the vehicle is stationary, the starting of the engine 12 is effected with the automatic transmission 18 placed in the neutral position "N". When the operation mode 9 is selected during running of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14. Even when the vehicle is running, the engine 12 can be started in the operation mode 9 by temporarily placing the automatic transmission 18 in the neutral position. Thus, the engine 12 can be started by the motor/generator 14.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero.

If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 7, and the motor/generator 14 is placed in the NON-LOAD state. Further, the engine 12 is turned OFF, that is, the throttle valve is closed, and the fuel injection amount if zeroed. As a result, an engine brake due to the drag resistance of the engine 12 is applied to the vehicle, whereby the required amount of operation of the brake pedal by the vehicle operator is reduced, facilitating the control of the vehicle running. Since the motor/generator 214 is placed in the NON-LOAD state and permitted to rotate freely in the operation mode 8, the electric energy storage device 58 is protected from excessive charging and resulting deterioration of its charging and discharging efficiencies.

In the operation mode 6 selected in step S6, the first clutch CE1 is released (turned OFF) and the second clutch CE2 is engaged (turned ON), while the engine 212 is turned OFF, and the motor/generator 14 is placed in the CHARGING state, as indicated in the table of FIG. 7, whereby the motor/generator 14 is driven by a kinetic energy of the motor vehicle, so as to charge the electric energy storage device 58 while applying a regenerative brake to the vehicle. The regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 7, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are 1: $(1+\rho E)$: $\rho E$, where $\rho E$ represents a gear ratio of the planetary gear device 16 ($\rho$=number of teeth of the sun gear 16s divided by number of teeth of the ring gear 16r). When the gear ratio $\rho E$ is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as $(1+\rho E)/\rho E$ times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is $(1+\rho)$ times the engine torque $T_E$.

The motor/generator 14 used in the hybrid drive system 10 of the present embodiment has a torque capacity which is about $\rho E$ times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 7. In this operation mode 7, the output of the carrier 16c is zeroed with the rotor shaft 14r of the motor/generator 214 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 7, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 7, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 7, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 7, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount SOC falling below the lower limit A, which would result in deterioration of the charging and discharging efficiencies of the storage device 58.

As described above, the operation modes 1–4 are selected in the following running states of the vehicle. When the electric energy amount SOC stored in the elecetric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

Figure 8:
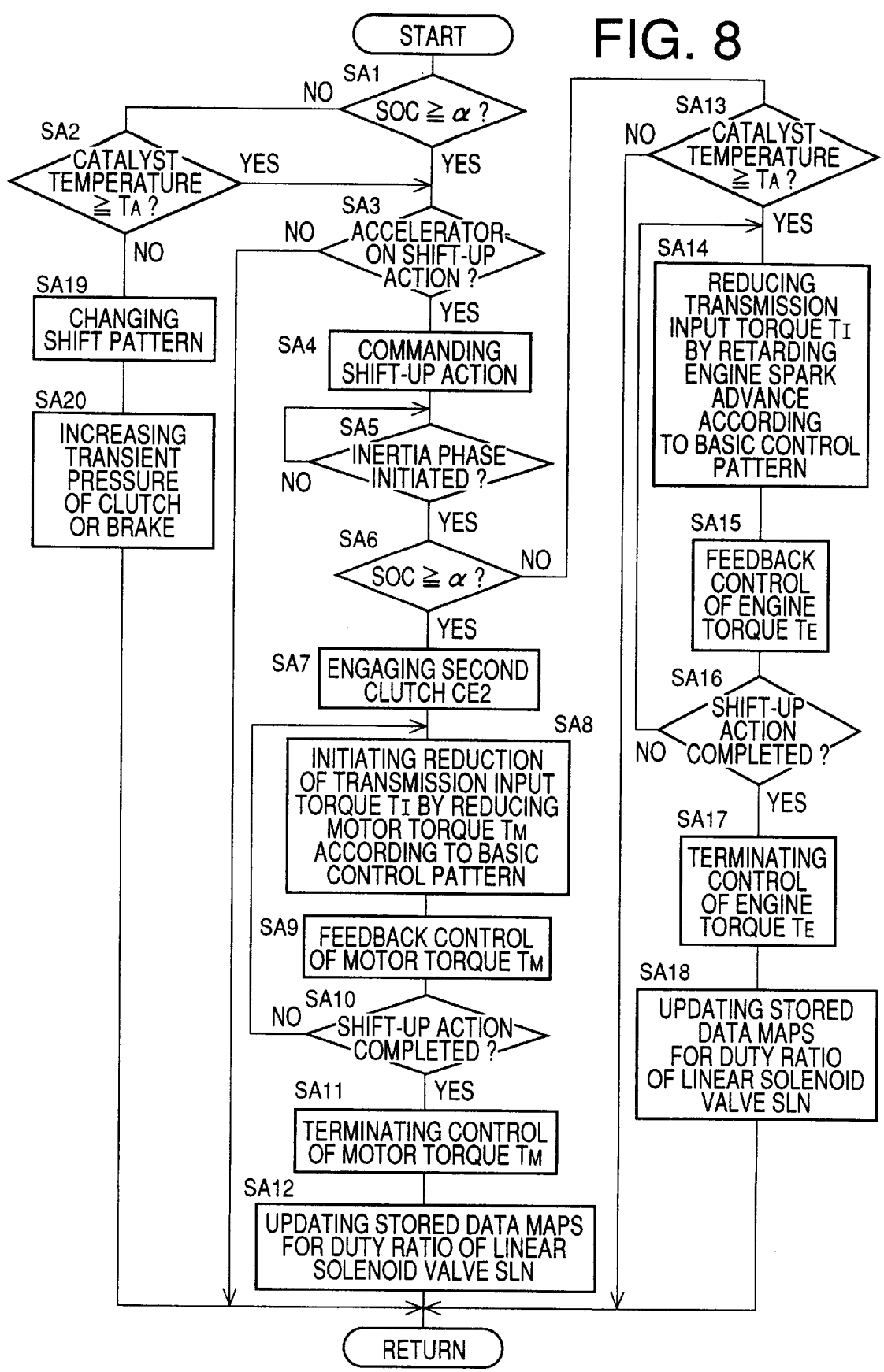
FIG. 8 is a flow chart illustrating a control routine for the hybrid drive system of FIG. 1, which is characteristic of this invention.

The hybrid drive controller 50 and the automatic transmission controller 52 are adapted to execute a routine illustrated in the flow chart of FIG. 8, for reducing the torque of the input shaft 26 of the automatic transmission 18 during an inertia phase of a shift-up action of the automatic transmission when the accelerator pedal is in a depressed state. It will be understood from the following description that steps SA3–SA18 of the routine of FIG. 8 correspond to torque reduction control means for reducing an input torque of a transmission in the form of the automatic transmission 18 upon a shifting action thereof under a predetermined condition, and that steps SA14 and SA1S correspond to first torque reducing means for controlling the engine 12 so as to reduce the input torque of the transmission, while steps SA8 and SA9 correspond to second torque reducing means for controlling the motor/generator 14 so as to reduce the input torque of the transmission. It will also be understood that steps SA6 and SA13 correspond to torque reduction mode selecting means for enabling one of the first and second torque reducing means to operate, according to a predetermined selecting condition, and steps SA12 and SA18 correspond to learning compensation means for learning compensation of a selected physical value which influences a shifting action of the transmission, for example, the duty ratio of the linear solenoid valve SLN.

The routine of FIG. 8 is initiated with step SA1 to determine whether the electric energy amount SOC stored in the storage device 58 is equal to or larger than a predetermined threshold α, namely, whether the motor/generator 14 can be used to reduce the torque $T_I$ of the input shaft 26 of the automatic transmission 18. If a negative decision (NO) is obtained in step SA1, the control flow goes to step SA2 to determine whether a temperature of a catalyst used in an exhaust gas purifying device is equal to or higher than a predetermined threshold $T_A$, that is, whether the retard control of space advance of the engine 12 is possible. The threshold α may be the lower limit A of the stored electric energy amount SOC described above with respect to steps S12, S16 and S18 of FIG. 6. The catalyst temperature can be detected by a suitable exhaust temperature sensor.

Figure 10:
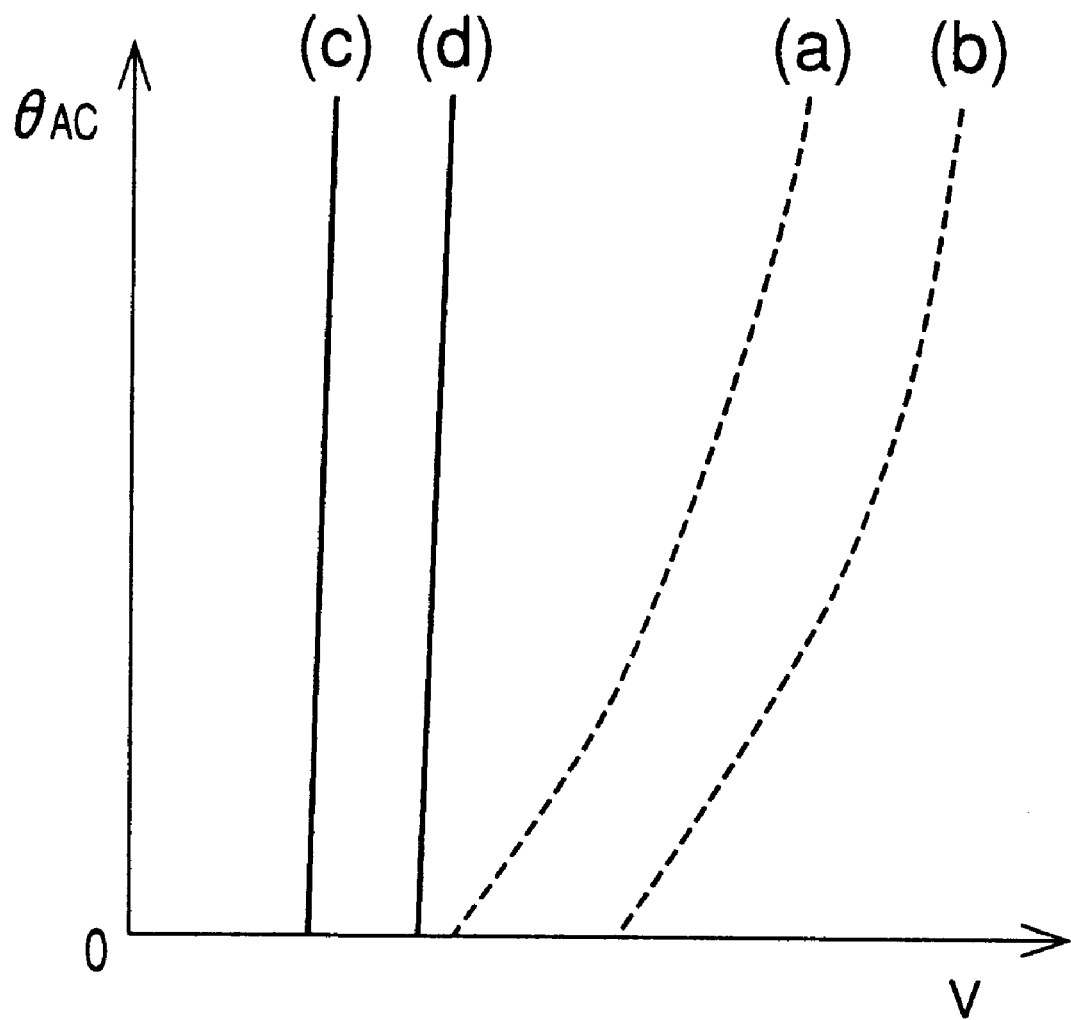
FIG. 10 is a view for explaining a change of transmission shift patterns in step SA19 of the routine of FIG. 8.

If a negative decision (NO) is obtained in step SA2, namely, if the reduction of the input torque $T_I$ of the automatic transmission 18 cannot be effected by controlling either the motor/generator 14 or the engine 12, the control flow goes to step SA19 to change shift patterns of the automatic transmission 18 so that the the shift-down and shift-up actions of the automatic transmission 18 are effected at a lower vehicle running speed V. For instance, the shift-down and shift-up boundary lines which are indicated by respective broken lines (a) and (b) in FIG. 10 are changed to shift-down and shift-up boundary lines indicated by respective solid lines (c) and (d) also indicated in FIG. 10. With the shift patterns changed to cause the automatic transmission 18 to be shifted at comparatively lower vehicle speed V, the rotating speed of the input shaft 26 of the automatic transmission 18 to be lowered, with a result of reducing the inertia of the input shaft 26. This arrangement makes it possible to reduce the torque of the input shaft 26 by controlling either the motor/generator 14 or the engine 12, as described in JP-B-5-13858. If the input torque of the automatic transmission 18 cannot be reduced, the shifting actions cannot be suitably controlled.

Step SA19 is followed by step SA20 to increase the transient hydraulic pressure of the frictional coupling device (one of the clutches C0–C2 and brakes B0–B4) which is engaged to establish the shifting action in question of the automatic transmission 18. Described in detail, step SA20 is implemented to change the duty ratio of the linear solenoid valve SLN, so as to increase the accumulator control pressure Pac described above. This arrangement to increase the hydraulic pressure of the frictional coupling device in question permits smooth engagement of the frictional coupling device, as described in JP-B-5-10249, and provides the same advantage as provided when the input torque of the automatic transmission 18 is reduced.

If an affirmative decision (YES) is obtained in step SA1 or SA2, the control flow goes to step SA3 to determine whether the automatic transmission 18 should be shifted up while the accelerator pedal is in a depressed state. The determination as to whether the automatic transmission 18 should be shifted up or not can be effected by determining whether a point determined by the currently detected vehicle speed V and operating amount $θ_{AC}$ of the accelerator pedal has moved across the shift-up boundary line (b) of FIG. 10, for example. The determination as to whether the accelerator pedal is in a depressed state can be effected on the basis of the detected operating amount $θ_{AC}$. This shift-up action will be referred to as "ACCELERATOR-ON shift-up action". If the ACCELERATOR-ON shift-up action of the automatic transmission 18 is required, the control flow goes to step SA4 a predetermined time after an affirmative decision (YES) is obtained in step SA3. In step SA4, a shift-up command is generated to initiate the ACCELERATOR-ON shift-up action, with the solenoid valves SL1–SL4 being suitably controlled.

Step SA4 is followed by step SA5 to determine whether the inertia phase of the automatic transmission 18 is initiated. This determination can be effected, for example, by determining whether the input speed $N_I$ (speed of the input shasft 26) of the automatic transmission 18 is lower than a product $(i_A × N_O)$ of the output speed $N_O$ (speed of the output shaft 19) of the automatic transmission 18 and a speed ratio $i_A$ of the operating position of the transmission 18 established prior to the shift-up action. If an affirmative decision (YES) is obtained in step SA5, the control flow goes to step SA6 to determine whether the electric energy amount SOC stored in the storage device 58 is equal to or larger than the predetermined threshold α. If an affirmative decision (YES) is obtained in step SA6, the control flow goes to step SA7 and the following steps for reducing the input torque $T_I$ of the automatic transmission 18 by controlling the motor/generator 14. If the stored electric energy amount SOC is smaller than the threshold α, the control flow goes to step SA13 identical with step SA2, to determine whether the catalyst temperature is equal to or higher than the threshold $T_A$. If an affirmative decision (YES) is obtained in step SA13, the control flow goes to step SA13 and the following steps for reducing the input torque $T_I$ by retarding the spark advance of the engine 12. In the present embodiment, the reduction of the input torque $T_I$ of the automatic transmission 18 is effected when the transmission 18 is in the inertia phase during an ACCELERATOR-ON shift-up action, that is, during a shift-up action while the accelerator pedal is in a depressed state. Thus, the affirmative decision (YES) is a predetermined condition under which the reduction of the input torque $T_I$ is reduced by the torque reduction control means. Further, the reduction of the input torque $T_I$ by controlling the motor/generator 14 or by effecting retard control of the spark advance of the engine 12 is effected depending upon whether the stored electric energy amount SOC is equal to or larger than the threshold α or not, and depending upon whether the catalyst temperature is equal to or higher than the threshold $T_A$ or not. Thus, step SA6 and SA13 cooperate with each other to provide the torque reduction mode selecting means. Described more specifically, the torque reduction selecting means is adapted to select the mode in which the input torque $T_I$ is reduced by controlling the motor/generator 14, if the stored electric energy amount SOC is not smaller than the threshold α, and select the mode in which the input torque $T_I$ is reduced by controlling the engine 12, if the stored electric energy amount SOC is smaller than the threshold α and if the catalyst temperature is not lower than the threshold $T_A$.

Step SA7 is provided to engage the second clutch CE2. This second clutch CE2 is engaged except when the hybrid drive system 10 is placed in the operation mode 5 for starting the vehicle by the engine 10, as indicated in FIG. 7. Therefore, the second clutch CE2 is usually kept in the engaged position in step SA7 upon the ACCELERATOR-ON shift-up action of the automatic transmission 18. Step SA7 is followed by step SA8 to initiate the reduction of the input torque $T_I$ of the automatic transmission 18 by controlling the motor/generator 14. The input torque $T_I$ may be reduced by reducing the forward rotation torque $T_M$ of the motor/generator 14 when the hybrid drive system 10 is placed in the operation mode 1 (MOTOR DRIVE mode) or operation mode 4 (ENGINE.MOTOR DRIVE mode), or controlling the motor/generator 14 so as to give a reverse rotation torque or a regenerative braking torque when the hybrid drive system 10 is placed in the operation mode 2 (ENGINE DRIVE mode).

Figure 9:
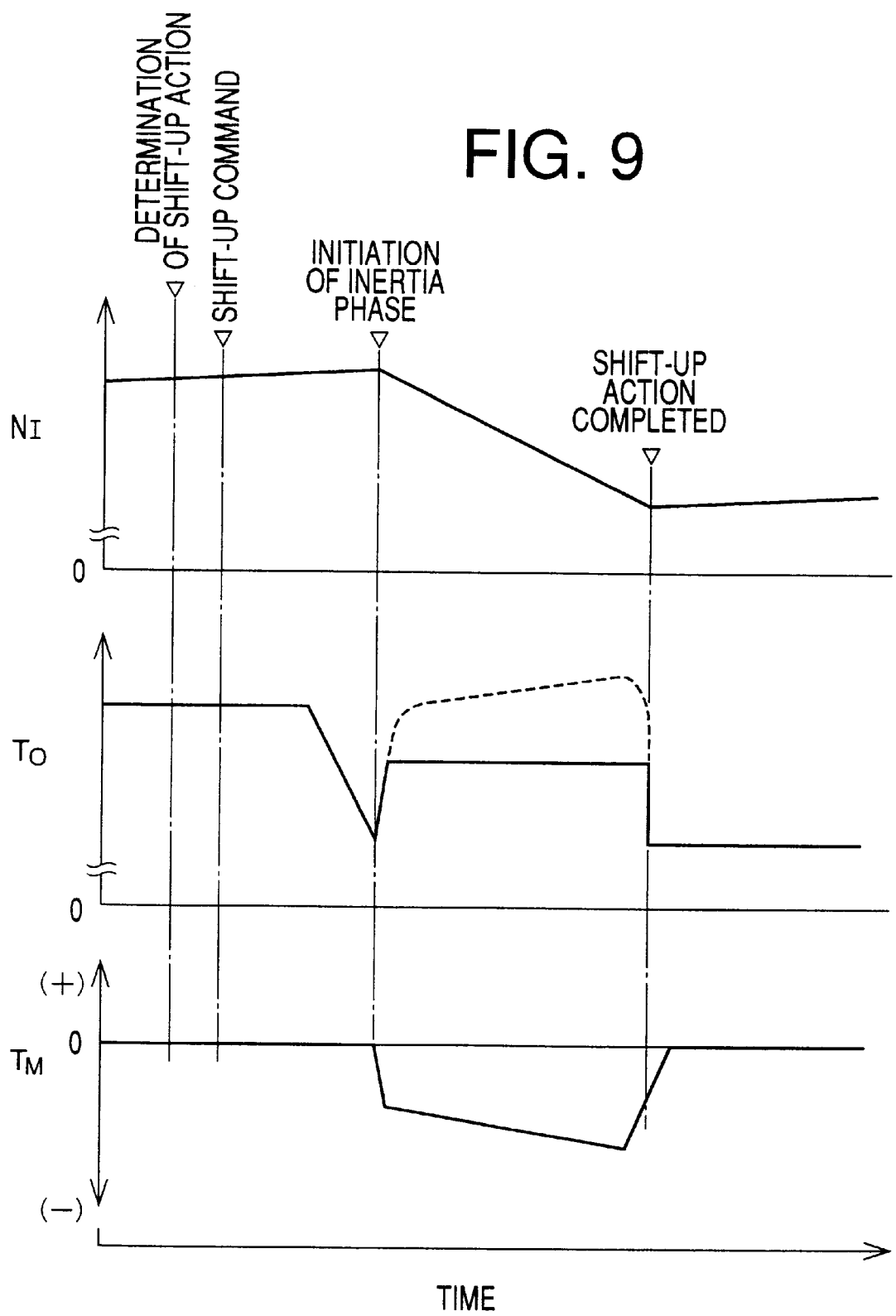
FIG. 9 is a time chart for explaining an example of changes of various parameters of the hybrid drive system when the input torque of the automatic transmission is reduced by controlling the motor/generator according to the routine of the flow chart of FIG. 8.

In step SA7, the motor torque $T_M$ (which may be the reverse rotation torque or regenerative braking torque) is controlled in a feed-forward fashion according to a predetermined basic control pattern or data map, depending upon the currently established operation mode of the hybrid drive system 10, and the input shaft speed $N_I$ and the kind of the shift-up action of the automatic transmission 18. As a result, the input speed $N_I$ or output torque $T_O$ of the automatic transmission 18 changes in a desired pattern as indicated in the graph of FIG. 9, by way of example. The basic control pattern is formulated to reduce the input torque $T_I$ by a suitable amount depending upon the inertia of the drive power source used. In the operation mode 4 (ENGINE.MOTOR DRIVE mode), the inertia of the engine 12 is also taken into account in determining the amount of reduction of the motor torque $T_M$ in step SA8. It is noted that the time chart of FIG. 9 shows an example of changes of the parameters $N_I$, $T_O$ and $T_M$ when the motor torque $T_M$ is reduced by giving the motor/generator 14 a reverse rotation torque when the hybrid drive system 10 is placed in the operation mode 2 (ENGINE DRIVE mode). This arrangement is effective to prevent an increase in the output torque $T_O$ which would occur due to the inertia of the engine 10 as indicated by broken line in FIG. 9.

Theoretically, the reduction of the motor torque $T_M$ according to the basic control pattern in step SA8 results in the change of the input speed $N_I$ or output torque $T_O$ of the automatic transmission 18 in the desired pattern. In step SA9, however, the motor torque $T_M$ is feedback-controlled so as to deal with a control error due to variations and chronological changes of the specific hybrid drive system 10 associated with the shift-up action of the automatic transmission 18. Described in detail, the motor torque $T_M$ is feedback-controlled or compensated so that the actual input speed $N_I$ or output torque $T_O$ changes according in a desired or target pattern. This arrangement is distinguished from an arrangement as disclosed in JP-A-63-212137 wherein the hydraulic pressure in the coupling device associated with a shifting action of the automatic transmission is feedback-controlled. A technique disclosed in JP-A-1-150050 may be utilized in step SA9.

Step SA9 is followed by step SA10 to determine whether the shift-up action of the automatic transmission 18 is completed. This determination may be effected by determining whether the input speed $N_I$ has become substantially equal to a product ($i_Z \times N_O$) of the output speed $N_O$ and a speed ratio $i_Z$ of the operating position of the automatic transmission 18 to be established as a result of the shift-up action in question. If a negative decision (NO) is obtained in step SA10, the control flow goes to step SA8, so that steps SA8 and SA9 are repeatedly implemented until the shift-up action is completed. The determination in step SA10 explained above is desirably backed up by a determination as to whether a predetermined time has passed after the initiation of the shifting action or initiation of the inertia phase of the automatic transmission 18. Upon completion of the shift-up action, the control flow goes to step SA11 to terminate the control of the motor/generator 14 for terminating the reduction of the input torque $T_I$, and restore the motor/generator 14 to the original state by slowly changing the motor torque $T_M$ to the original or normal value.

Step SA11 is followed by step SA12 to update stored data maps which determine the engaging pressure of the coupling device associated with the shift-up action, so that the engaging pressure of the coupling device in question is controlled in step SA4 according to the thus updated data maps, upon the next occurrence of the ACCELERATOR-ON shift-up action of the automatic transmission 18. The data maps are updated in step SA12 by learning compensation on the basis of the amount of change of the motor torque $T_M$ in the feedback control in step SA9 or the time duration of the shift-up action. The stored data maps to be updated in step SA12 may be data maps representative of predetermined relationships between the duty ratio of the linear solenoid valve SLN (which duty ratio corresponds to the accumulator control pressure Pac) and selected parameters as used for the control of the motor torque $T_M$ in step SA8, such as: the currently established operation mode of the hybrid drive system 10; the input speed $N_I$ of the automatic transmission 18; and the kind of the shift-up action (e.g., 2-3 shift-up action) of the automatic transmission 18. For instance, step SA12 may be adapted to update the stored data maps so that the duty ratio of the linear solenoid valve SLN is changed in the next cycle of execution of the routine of FIG. 8, so as to reduce the amount of change of the motor torque $T_M$ in the feedback control in step SA9 if the amount of change of the motor torque $T_M$ in the last control cycle is larger than the optimum value, for example, as disclosed in JP-A-3-37470. A technique disclosed in JP-A-63-291738 may be utilized for the learning compensation of the duty ratio of the linear solenoid valve SLN in step SA12. The data maps updated in step SA12 are used in step SA4 in the next occurrence of the shift-up action, to determine the duty ratio of the linear solenoid valve SLN, in the case where the affirmative decision is obtained in step SA6, that is, where the input torque $T_I$ is controlled by controlling the motor torque $T_M$. In this connection, it is noted that step SA6 is implemented concurrently as step SA4. Thus, the engaging pressure of the appropriate coupling device is controlled according to the stored data maps which are updated by learning compensation in step SA12. It will be understood that the duty ratio of the linear solenoid valve SLN is an example of a physical value which influences the shift-up action of the automatic transmission 18. This physical value is considered to be updated from time to time by learning compensation in step Where the electric energy amount SOC stored in the storage device 58 is smaller than the threshold α and where the catalyst temperature is not lower than the threshold $T_A$, the control flow goes to step SA14 in which the input torque $T_I$ by effecting the retard control of spark advance of the engine 12. When the stored electric energy SOC is smaller than the threshold $\alpha$, the motor/generator 14 cannot be used as the drive power source for driving the motor vehicle, and the hybrid drive system 10 is usually placed in the ENGINE DRIVE mode (operation mode 2) or ENGINE DRIVE+ CHARGING mode (operation mode 3). In this condition, the input torque $T_I$ can be reduced by reducing the output of the engine 12 by controlling its spark advance.

As in step SA8 for reducing the input torque $T_I$ by controlling the motor/generator 14, the engine torque $T_E$ is controlled in a feed-forward fashion according to a predetermined basic control pattern or data map, depending upon the input shaft speed $N_I$ and the kind of the shift-up action of the automatic transmission 18, so that the input speed $N_I$ or output torque $T_O$ of the automatic transmission 18 changes in a desired pattern. Step SA14 is followed by step SA15 to effect feedback control of the engine torque $T_E$ for permitting the actual input speed $N_I$ or output torque $T_O$ to change in a desired or target pattern, irrespective of the variations and chronological changes of the hybrid drive system 10.

Step SA15 is followed by step SA16 identical with step SA10, to determine whether the shift-up action in question is completed. If an affirmative decision (YES) is obtained in step SA16, the control flow goes to step SA17 to terminate the retard control of the spark advance of the engine 12 for terminating the reduction of the input torque $T_I$, and restore the engine 12 to the original state. Then, the control flow goes to step SA18 similar to step SA12, to update stored data maps depending upon the amount of change of the engine torque $T_E$ in the feedback control in step SA15. These data maps updated in step SA18 are used for determining the duty ratio of the linear solenoid valve SLN to be used in step SA4 for controlling the engaging pressure of the appropriate coupling device, in the next occurrence of the shift-up action, in the case where the input torque $T_I$ is reduced by retarding the spark advance of the engine 12, with the affirmative action obtained in step SA13.

In the hybrid drive system 10 according to the present embodiment, the control apparatus including the hybrid drive controller 50 and the automatic transmission controller 52 provides: the first torque reducing means corresponding to steps SA14 and SA15 for reducing the input torque $T_I$ of the automatic transmission 18 by reducing the torque $T_E$ of the engine 12; the second torque reducing means corresponding to steps SA8 and SA9 for reducing the input torque $T_I$ by reducing the torque $T_M$ of the motor/generator 14; and the torque reduction mode selecting means corresponding to steps SA6 and SA13 for selectively enabling the first or second torque reducing means to operate, according to the predetermined selecting condition. Since the first and second torque reducing means are provided, the input torque $T_I$ of the automatic transmission 18 can be suitably reduced over a wider variety of running condition of the vehicle, so as to effectively prevent an undesirable increase in the output torque $T_O$ in the inertia phase of the automatic transmission 18 during an ACCELERATOR-ON shift-up action thereof, than in the arrangement adapted to use only the motor/generator 14 or the engine 12 as the source for reducing the input torque $T_I$.

The present control apparatus for the hybrid drive system 10 is adapted to use the second torque reducing means for controlling the motor/generator 14 so as to reduce the input torque $T_I$, where the motor/generator 14 can be operated for this purpose with the stored electric energy amount SOC being equal to or larger than the threshold $\alpha$, and to use the first torque reducing means for controlling the engine 12 so as to reduce the input torque $T_I$, where the stored electric energy amount SOC is smaller than the threshold $\alpha$. In the present arrangement, the input torque $T_I$ can be suitably reduced by retarding the spark advance of the engine 12, even when the motor/generator 14 cannot be used as the source for reducing the input torque $T_I$.

Further, step SA8 is formulated to change the motor torque $T_M$ for reducing the input torque $T_I$, according to the predetermined basic control pattern depending upon the operating states of the engine 12 and motor/generator 14, namely, depending upon the currently established operation mode of the hybrid drive system 10. This arrangement permits adequate reduction of the input torque $T_I$ with high accuracy, irrespective of a variation in the inertia of the engine 12 and motor/generator 14.

It is also noted that steps SA12 and SA18 are formulated to update the stored data maps for determining the engaging pressure of the hydraulically operated frictional coupling device during the shift-up action of the automatic transmission, more particularly, the duty ratio of the linear solenoid valve SLN. The data maps are updated by learning compensation on the basis of the amount of change of the motor torque $T_M$ or engine torque $T_E$ in the feedback control in step SA9 or SA15. The data maps used when the engine 12 is controlled to reduce the input torque $T_I$ and the data maps used when the motor/generator 14 is controlled to reduce the input torque $T_I$ are different from each other. This arrangement permits accurate control of the engaging pressure of the appropriate coupling device during the shift-up action of the automatic transmission 18, irrespective of differences of the control accuracy and response between the first torque reducing means using the engine 12 and the second torque reducing means using the motor/generator 14.

The present embodiment is arranged such that the only the motor/generator 14 or the engine 12 is used to reduce the input torque T1 even when the hybrid drive system 10 is placed in the ENGINE.MOTOR DRIVE mode (operation mode 4). This arrangement permits easier control of the input torque $T_I$ with high accuracy than the arrangement in which both the engine 12 and the motor/generator 14 are used to reduce the input torque $T_1$.

While the second clutch CE2 is engaged in step SA7, it may be released in step SA7 when the hybrid drive system 10 is placed in the ENGINE.MOTOR DRIVE mode (operation mode 4), so that the motor/generator 14 is controlled in steps SA8 and SA9 with the second clutch CE2 held in the released state.

In the present embodiment, the reduction of the input torque $T_I$ by controlling the motor/generator 14 is inhibited when the stored electric energy amount SOC is smaller than the threshold $\alpha$. However, the reduction of the input torque $T_I$ by controlling the motor/generator 14 may be effected even when the electric energy amount SOC is smaller than the threshold $\alpha$, if the input torque $T_I$ can be reduced by regenerative braking of the motor/generator 14, for example, when the hybrid drive system 10 is placed in the ENGINE DRIVE mode (operation mode 2). On the other hand, the reduction of the input torque $T_I$ by controlling the engine 12 in steps SA14, SA14 may be inhibited if the catalyst temperature is higher than a predetermined upper limit, or if the frequency of the reduction of the input torque $T_I$ by retard control of the spark advance of the engine 12 is higher than a predetermined upper limit. Thus, the conditions for operating the first and second torque reducing means (SA8, SA9, SA14, SA15) may be modified as needed.

Further, the engaging pressure of the frictional coupling device associated with the shifting action of the automatic transmission 18, more specifically, the accumulator control pressure Pac may be reduced while the motor/generator 14 or engine 12 is controlled to reduce input torque $T_I$.

Although the spark advance of the engine 12 is retarded to reduce the input torque $T_I$ in steps SA14 and SA15, these steps may be adapted to control the throttle valve so as to reduce the input torque $T_I$, if the response of the reduction of the input torque $T_I$ to a change in the opening angle of the throttle valve is acceptable. In this case, the reduction of the input torque $T_I$ by controlling the throttle opening angle is not restricted by the catalyst temperature.

Other embodiments of the present invention will be described by reference to FIGS. 11–19. These embodiments are substantially identical with the first embodiment, but are different from the first embodiment in the software of the control apparatus, as described below in detail.

Figure 11:
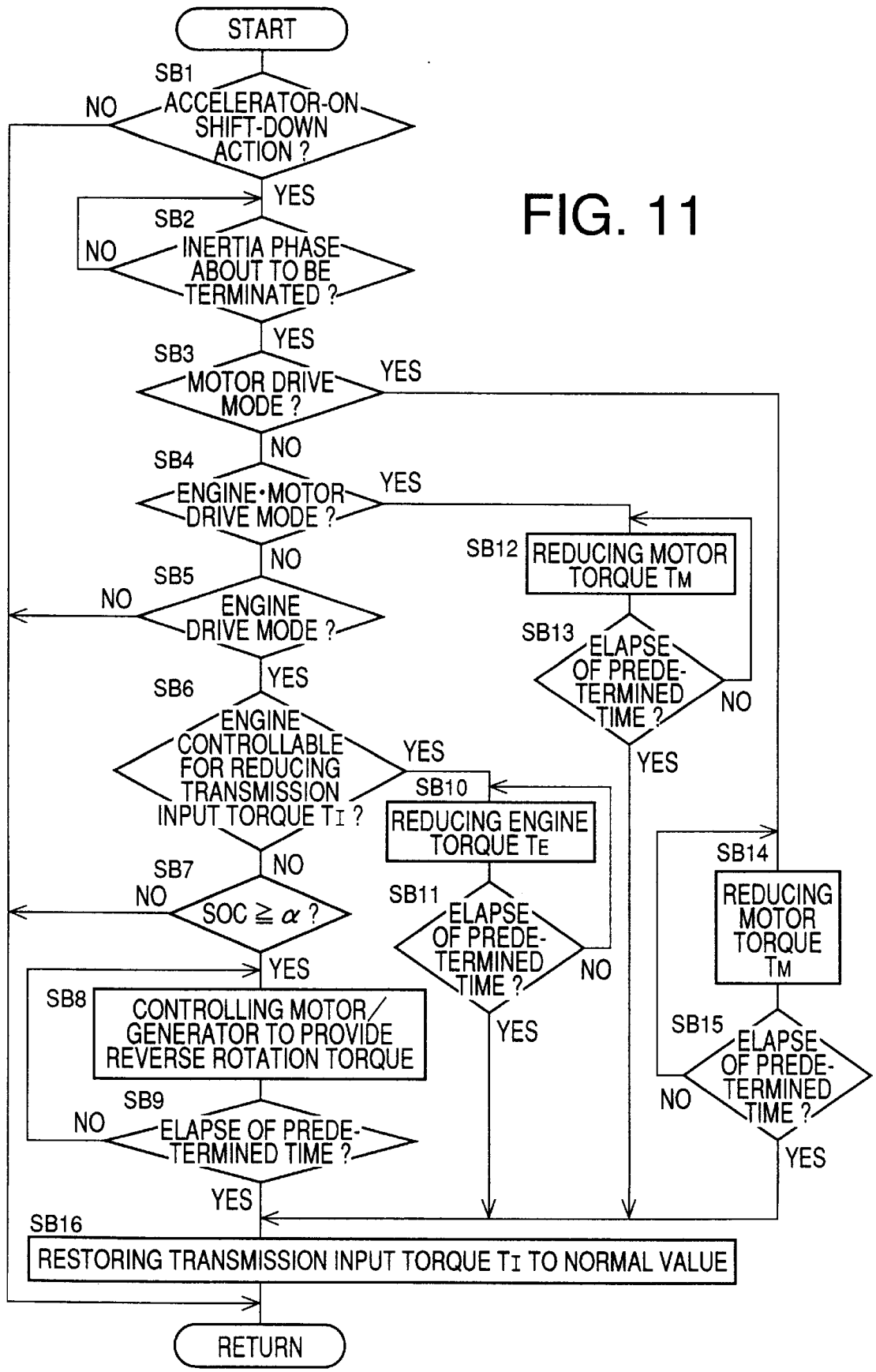
FIG. 11 is a flow chart illustrating a control routine for the hybrid drive system in another embodiment of this invention.
Figure 12:
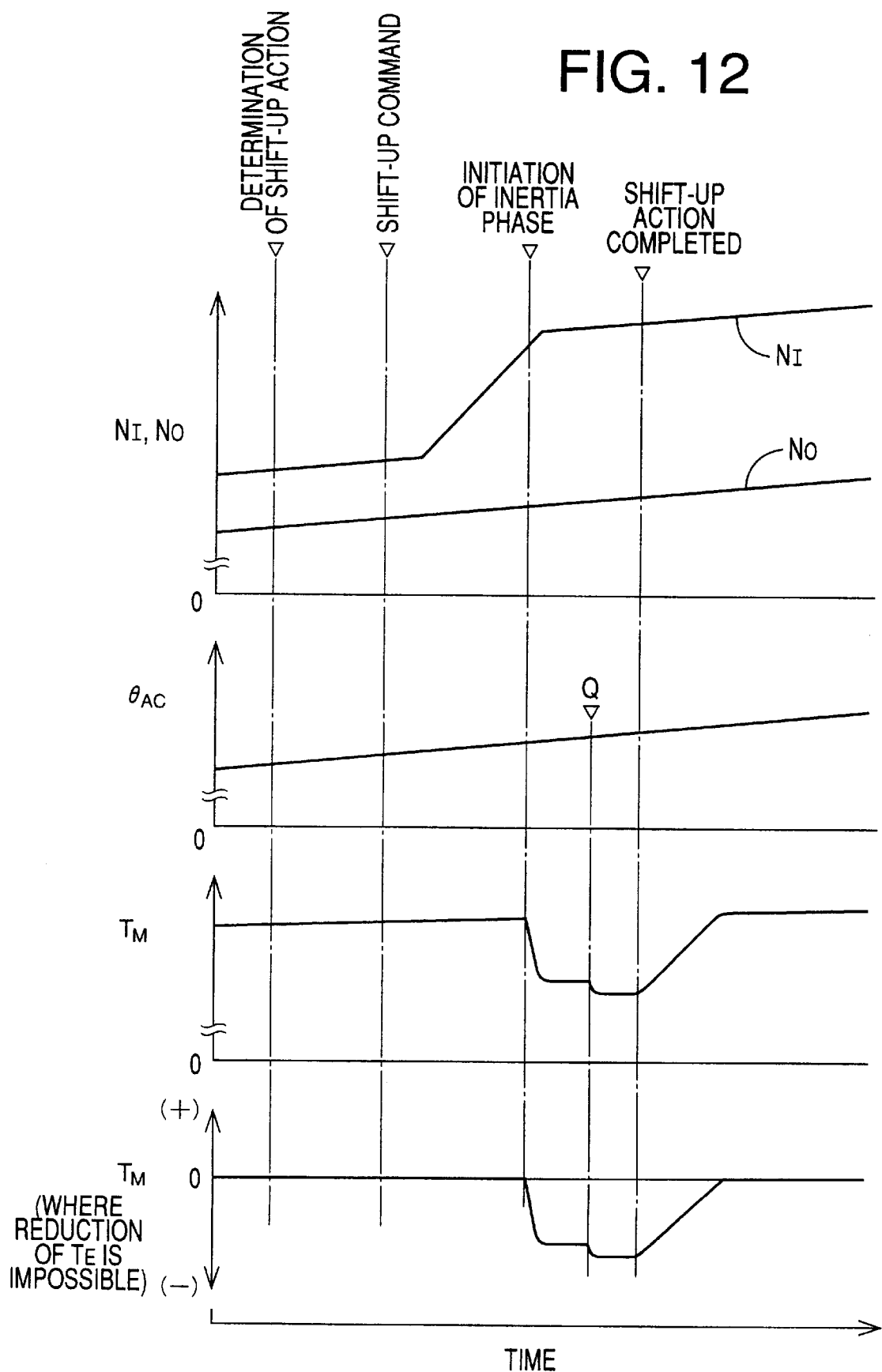
FIG. 12 is a time chart for explaining an example of changes of the parameters of the hybrid drive system when the input torque of the automatic transmission is reduced according to the routine of FIG. 11.

In the second embodiment, the input torque $T_I$ of the automatic transmission 18 is reduced during an ACCELERATOR-ON shift-down action of the automatic transmission 18, as disclosed in JP-A-2-3545, according to a routine illustrated in the flow chart of FIG. 11, which is executed by the controllers 50, 52. This routine may be executed in addition to the routine of FIG. 8 of the first embodiment. It will be understood from the following description that steps SB1–SB16 of the routine of FIG. 11 correspond to the torque reduction control means, and that step SB10 corresponds to the first torque reducing means while steps SB8, SB12 and SB14 correspond to the second torque reducing means. It will also be understood that steps SB3–SB7 correspond to the torque reduction mode selecting means. A time chart of FIG. 12 shows an example of changes of parameters where the input torque $T_I$ is reduced according to the routine of FIG. 11 during the shift-down action of the automatic transmission.

The routine of FIG. 11 is initiated with step SB1 to determine whether the automatic transmission 18 should be shifted down with the accelerator pedal being depressed, that is, whether a shift-down action of the automatic transmission 18 is required while the accelerator pedal is in a depressed state. This determination may be effected by determining whether the point defined by the detected vehicle speed V and operating amount $\theta_{AC}$ of the accelerator pedal has moved across the shift-down boundary line indicated by broken line (a) in FIG. 10. The depression of the accelerator pedal can be found on the basis of the detected operating amount $\theta_{AC}$. If an affirmative decision (YES) is obtained in step SB1, a shift-down command is generated a predetermined time after the affirmative decision is obtained, so that the solenoid valves SL1–SL4 are suitably energized or de-energized so as to achieve the shift-down action of the automatic transmission 18. Further, step SB2 is implemented to determine whether the shift-down action has entered a terminal portion of the inertia phase, namely, whether the inertia phase is about to be terminated. This determination may be effected by determining whether the input speed $N_I$ has become higher than a threshold ($i_Z \times N_O - \beta$), "$i_Z$" representing the speed ratio of the position of the automatic transmission 18 established after the shift-down action, while "β" representing a predetermined value. If an affirmative decision (YES) is obtained in step SB2, the control flow goes to step SB3 and the following steps to reduce the input torque $T_I$. The predetermined value β may be a fixed constant, or a variable which changes depending upon a suitable parameter such as the kind of the shift-down action (e.g., 3-2 shift-down action) and the operating amount $\theta_{AC}$ of the accelerator pedal. The operation in steps SB3–SB16 to reduce the input torque $T_I$ is initiated a predetermined time after the affirmative decision is obtained in step SB2. That is, the lapse of the predetermined time after a predetermined terminal point of the inertia phase of the shift-down action is a predetermined condition for initiating the reduction of the input torque $T_I$.

Step SB3 is provided to determine whether the hybrid drive system 10 is placed in the MOTOR DRIVE mode (operation mode 1). If an affirmative decision (YES) is obtained in step SB3, the control flow goes to step SB14 to reduce the torque $T_M$ of the motor/generator 14 to thereby reduce the input torque $T_I$. The amount of reduction of the motor torque $T_M$ is determined according to a predetermined depending upon the operating amount $\theta_{AC}$ of the accelerator pedal, the kind of the shift-down action and the vehicle speed V. The vehicle speed V is taken into account in determining the amount of reduction of the input torque $T_I$, since the ACCELERATOR-ON shift-down action usually takes place as a result of change in the operating amount $\theta_{AC}$ of the accelerator pedal with the vehicle speed V being held substantially constant. If the operating amount $\theta_{AC}$ is subsequently changed, the amount of reduction of the input torque $T_I$ is changed according to the data map. The graph next to the lowermost graph in the time chart of FIG. 12 shows an example of a change in the motor torque $T_M$ as a result of the control in the present step SB14 or in step SB12 and the subsequent steps described below. The amount of reduction of the motor torque $T_M$ is increased at point Q during an increase in the operating amount $\theta_{AC}$.

Step SB14 is followed by step SB15 to determine whether a predetermined time has elapsed after the initiation of the operation in step SB14 to reduce the input torque $T_I$ by reducing the motor torque $T_M$. Step SB14 is repeatedly implemented until the predetermined time has elapsed. The predetermined time is determined according to a predetermined data map or equation, depending upon the operating amount $\theta_{AC}$ upon initiation of the operation in step SB14 and the kind of the shift-down action in question. If an affirmative decision (YES) is obtained in step SB14, the control flow goes to step SB16 to gradually restore the motor torque $T_M$ (input torque $T_I$) to a normal value, for a predetermined time which varies depending upon the operating amount $\theta_{AC}$ upon expiration of the above-indicated predetermined time (upon termination of the operation in step SB14) and the kind of the shift-down action in question.

If a negative decision (NO) is obtained in step SB3, that is, the hybrid drive system 10 is not placed in the MOTOR DRIVE mode, the control flow goes to step SB4 to determine whether the hybrid drive system 10 is placed in the ENGINE.MOTOR DRIVE mode (operation mode 4). If an affirmative decision (YES) is obtained in step SB4, the control flow goes to steps SB12, SB13 and SB16 for reducing the motor torque $T_M$ to reduce the input torque $T_I$ of the automatic transmission 18, as in steps SB14–SB16. The amount of reduction of the input torque $T_I$ in this case is determined by taking into account also the inertia of the engine 12, that is, the total torque of the engine 12 and the motor/generator 14. A predetermined time used in step SB13, that is, the time duration of the operation in step SB12, and the time during which the motor torque $T_M$ is gradually increased in step SB16 to the normal value are determined so as to meet the ENGINE.MOTOR DRIVE mode, independently of those used in the other modes of the hybrid drive system 10.

If a negative decision (NO) is obtained in step SB4, that is, when the hybrid drive system 10 is not placed in the ENGINE.MOTOR DRIVE mode, the control flow goes to step SB5 to determine whether the hybrid drive system 10 is placed in the ENGINE DRIVE mode (operation mode 2). If an affirmative decision (YES) is obtained in step SB5, the control flow goes to step SB6 to determine whether the engine 12 can be controlled to reduce the input torque $T_I$ of the automatic transmission 18, more specifically, whether the retard control of the spark advance of the engine 12 can be effected to reduce the input torque $T_I$. A negative decision (NO) is obtained in step SB6 if the catalyst temperature is not lower than a predetermined value, as in step SA13 of the first embodiment, or if the frequency of reduction of the input torque $T_I$ by retarding the spark advance of the engine 12 is higher than a predetermined upper limit. If an affirmative decision (YES) is obtained in step SB6, the control flow goes to steps SB10, SB11 and SB16 for reducing the engine output $T_E$ by controlling the spark advance of the engine 12, to thereby reduce the input torque $T_I$. A predetermined time used in step SB11, that is, the time duration of the operation in step SB10, and the time during which the motor torque $T_M$ is gradually increased in step SB16 to the normal value are determined so as to meet the ENGINE DRIVE mode, independently of those used in the other modes of the hybrid drive system 10. A technique for reducing the input torque $T_I$ by effecting the retard control of the spark advance of the engine is disclosed in JP-A-2-3545.

If a negative decision (NO) Is obtained in step SB6, that is, the retard control of the spark advance of the engine 12 is not possible to reduce the input torque $T_I$, the control flow goes to step SB7 to determine whether the stored electric energy amount SOC is equal to or larger than the threshold α (lower limit A), in other words, whether the input torque $T_I$ can be reduced by controlling the motor/generator 14. If an affirmative decision (YES) is obtained in step SB7, the control flow goes to steps SB8, SB9 and SB16 for giving the motor/generator 14 a reverse rotation torque to thereby reduce the input torque $T_I$. The amount of reduction of the input torque $T_I$, that is, the amount of reduction of the motor torque $T_M$ in the reverse direction, a predetermined time used in step SB9 and the time duration of the operation in step SB16 may be the same as those used for reducing the input torque $T_I$ by retarding the spark advance of the engine 12 in steps SB10, SB11 and SB16, but may be determined differently, depending upon differences in the control response and accuracy between the control of the engine torque $T_E$ and the control of the motor torque $T_M$ for reducing the input torque $T_I$. The lowermost graph in FIG. 12 shows an example of change of the motor torque $T_M$ in steps SB8, SB9 and SB16.

In the hybrid drive system 10 according to the present second embodiment of FIG. 11, the control apparatus provides: the first torque reducing means corresponding to step SB10 for reducing the input torque $T_I$ of the automatic transmission 18 by reducing the torque $T_E$ of the engine 12; the second torque reducing means corresponding to steps SB8, SB12, SB14 for reducing the input torque $T_I$ by reducing the torque $T_M$ of the motor/generator 14; and the torque reduction mode selecting means corresponding to steps SB3–SB6 for selectively enabling the first or second torque reducing means to operate, according to the predetermined selecting condition. Since the first and second torque reducing means are provided, the input torque $T_I$ of the automatic transmission 18 can be suitably reduced over a wider variety of running condition of the vehicle, so as to effectively prevent an undesirable increase in the output torque $T_O$ in the inertia phase of the automatic transmission 18 in a terminal portion of an ACCELERATOR-ON shift-down action thereof, than in the arrangement adapted to use only the motor/generator 14 or the engine 12 as the source for reducing the input torque $T_I$.

The present second embodiment is arranged to selectively use the first or second torque reducing means depending upon the currently established operation mode of the hybrid drive system 10, so that the input torque $T_I$ is reduced by reducing the torque $T_M$ of the motor/generator 14 in the MOTOR DRIVE mode or ENGINE.MOTOR DRIVE mode, and by retarding the spark advance of the engine 12, as a rule, in the ENGINE DRIVE mode. This second embodiment is effective to reduce the frequency of use of the motor/generator 14 to reduce the input torque $T_I$ and accordingly reduce an electric energy loss, as compared with the first embodiment adapted to use the motor/generator 14 in all operation modes as a rule.

Further, the second embodiment is adapted to suitably reduce the input torque $T_I$ by giving a reverse rotation torque to the motor/generator 14, even in the ENGINE DRIVE mode, in the case where the retard control of the spark advance of the engine 12 cannot be effected to reduce the input torque $T_I$.

The amounts of reduction of the input torque $T_I$, time duration of the operation to reduce the input torque $T_I$ and the time duration of the operation to restore the engine torque $T_E$ or motor torque $T_M$ to the normal value are determined differently in the four different torque reduction modes (steps SB8, SB9 and SB16; steps SB10, SB11 and SB16; steps SB12, SB13 and SB16; and steps SB14, SB14 and SB16), depending upon the operation mode of the hybrid drive system 10 and the source (engine 12 or motor/generator 14) used for reducing the input torque $T_I$, so that the input torque $T_I$ can be controlled with high accuracy, irrespective of a difference in the inertia between the engine 12 and the motor/generator 14 and differences of control accuracy and response between the control of the engine 12 and the control of the motor/generator 14 to reduce the input torque $T_I$.

In addition, the second embodiment of FIG. 11 is adapted to reduce the input torque $T_I$ by controlling only the motor/generator 14 even when the hybrid drive system 10 is placed in the ENGINE.MOTOR DRIVE mode (operation mode 4). This arrangement permits easier control of the input torque $T_I$ with high accuracy than the arrangement in which both the engine 12 and the motor/generator 14 are used to reduce the input torque $T_I$.

Figure 13:
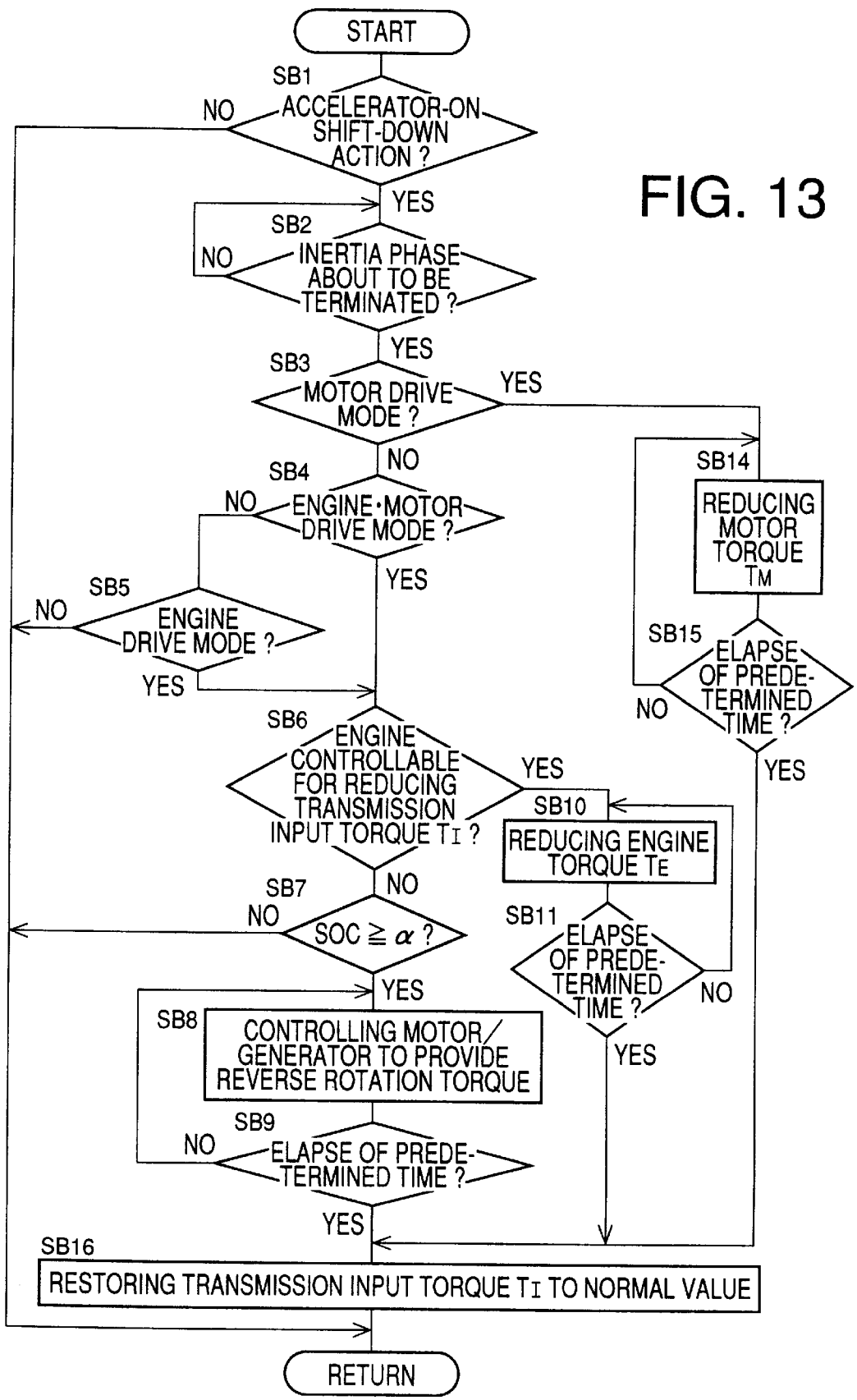
FIG. 13 is a flow chart illustrating a control routine in a further embodiment of the invention.
Figure 14:
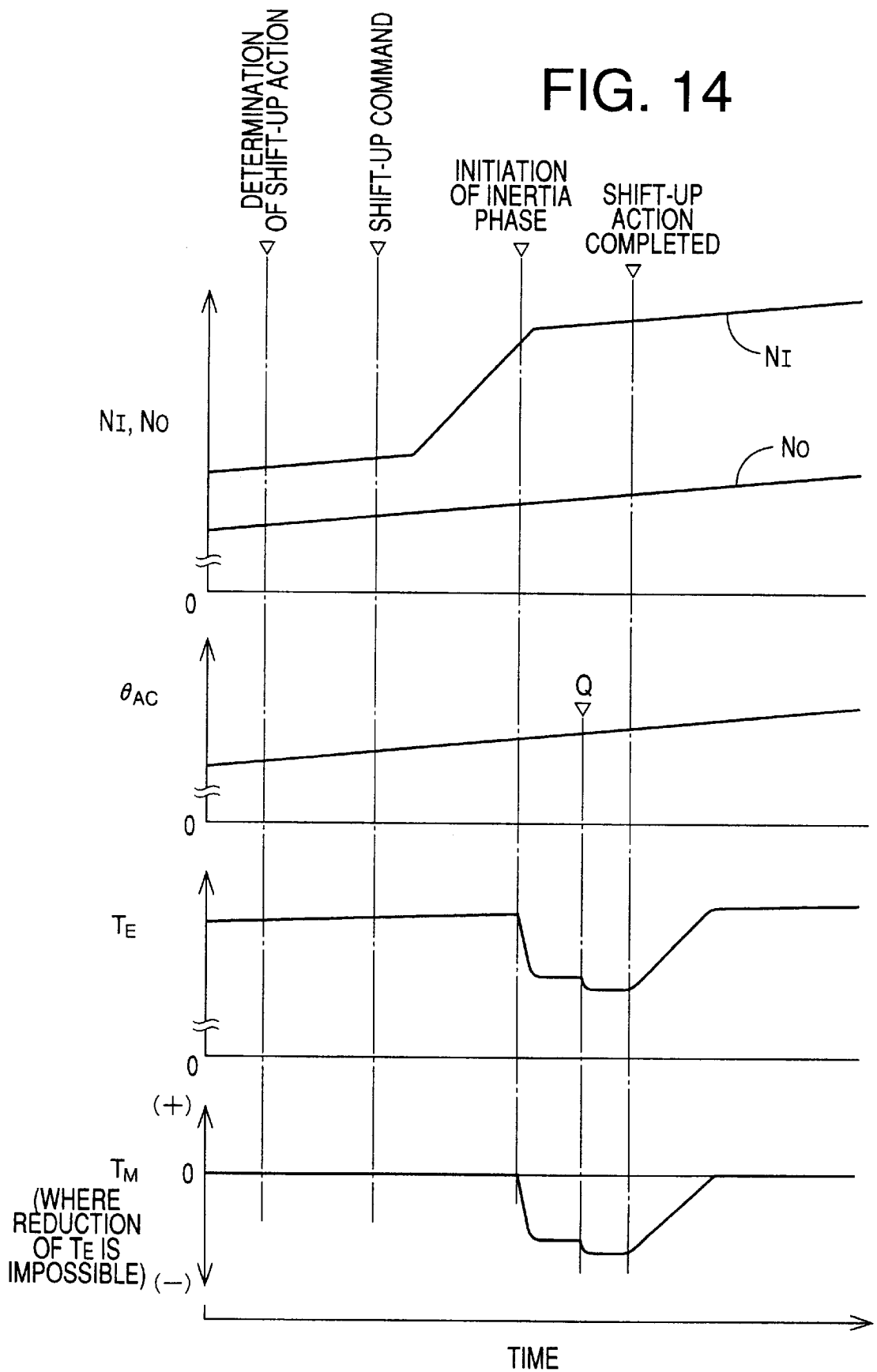
FIG. 14 is a time chart for explaining an example of changes of the parameters when the input torque of the automatic transmission is reduced according to the routine of FIG. 13.

The third embodiment of FIGS. 13 and 14 is different from the second embodiment of FIGS. 11 and 12, in that steps SB10, SB11, SB16 are implemented in the ENGINE.MOTOR DRIVE mode as well as in the ENGINE DRIVE mode. That is, the input torque $T_I$ is reduced in the ENGINE.MOTOR DRIVE mode, by retarding the spark advance of the engine 12 as a rule. The third embodiment of FIGS. 13 and 14 provides substantially the same advantages as the second embodiment of FIGS. 11 and 12. The graph next to the lowermost graph in FIG. 14 shows an example of change of the engine torque $T_E$ as a result of the retard control of the spark advance of the engine 12 in step SB10 in the ENGINE.MOTOR DRIVE mode and the ENGINE DRIVE mode, while the lowermost graph shows an example of change of the motor torque $T_M$ as a result of controlling the motor/generator 14 in step SB8 in the ENGINE DRIVE mode.

In the fourth embodiment of this invention, the input torque $T_I$ of the automatic transmission 18 is reduced upon overshooting of the input shaft speed $N_I$ during a so-called "clutch-to-clutch shifting action" of the automatic transmission 18. The reduction of the input torque $T_I$ in the fourth embodiment is effected according to a routine illustrated in the flow chart of FIG. 15, which is executed by the controllers 50, 52. It will be understood from the following description that steps SC1–SC20 of the routine of FIG. 15 correspond to the torque reduction control means, and that step SC8 corresponds to the first torque reducing means while steps SC6, SC10 and SC14 correspond to the second torque reducing means. It will also be understood that steps SC4, SC5, SC9, SC13 and SC17 correspond to the torque reduction mode selecting means, while steps SC8, SC12, SC16 and SC20 correspond to the learning compensation means.

Figure 15:
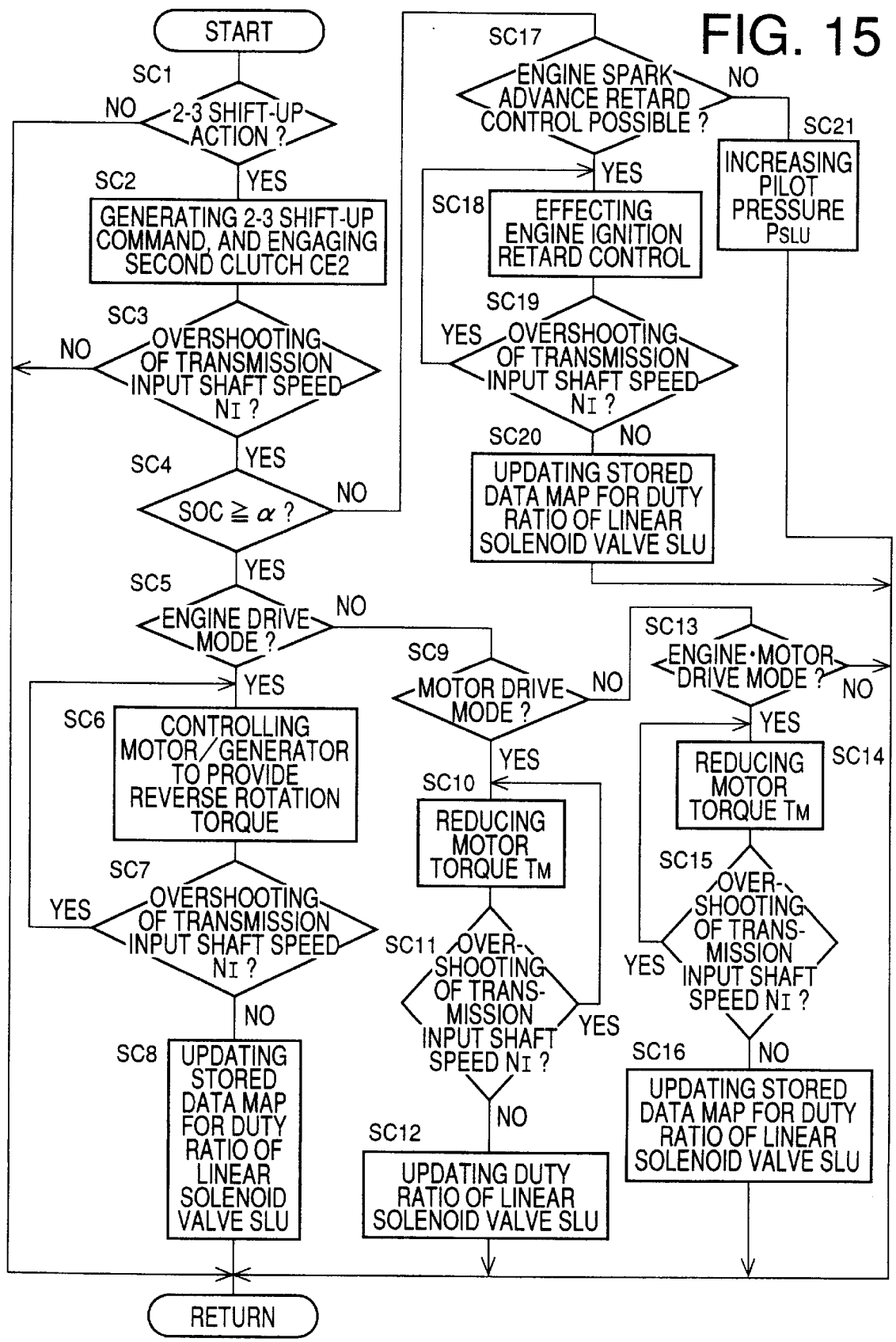
FIG. 15 is a flow chart illustrating a control routine in a still further embodiment of the invention.
Figure 16:
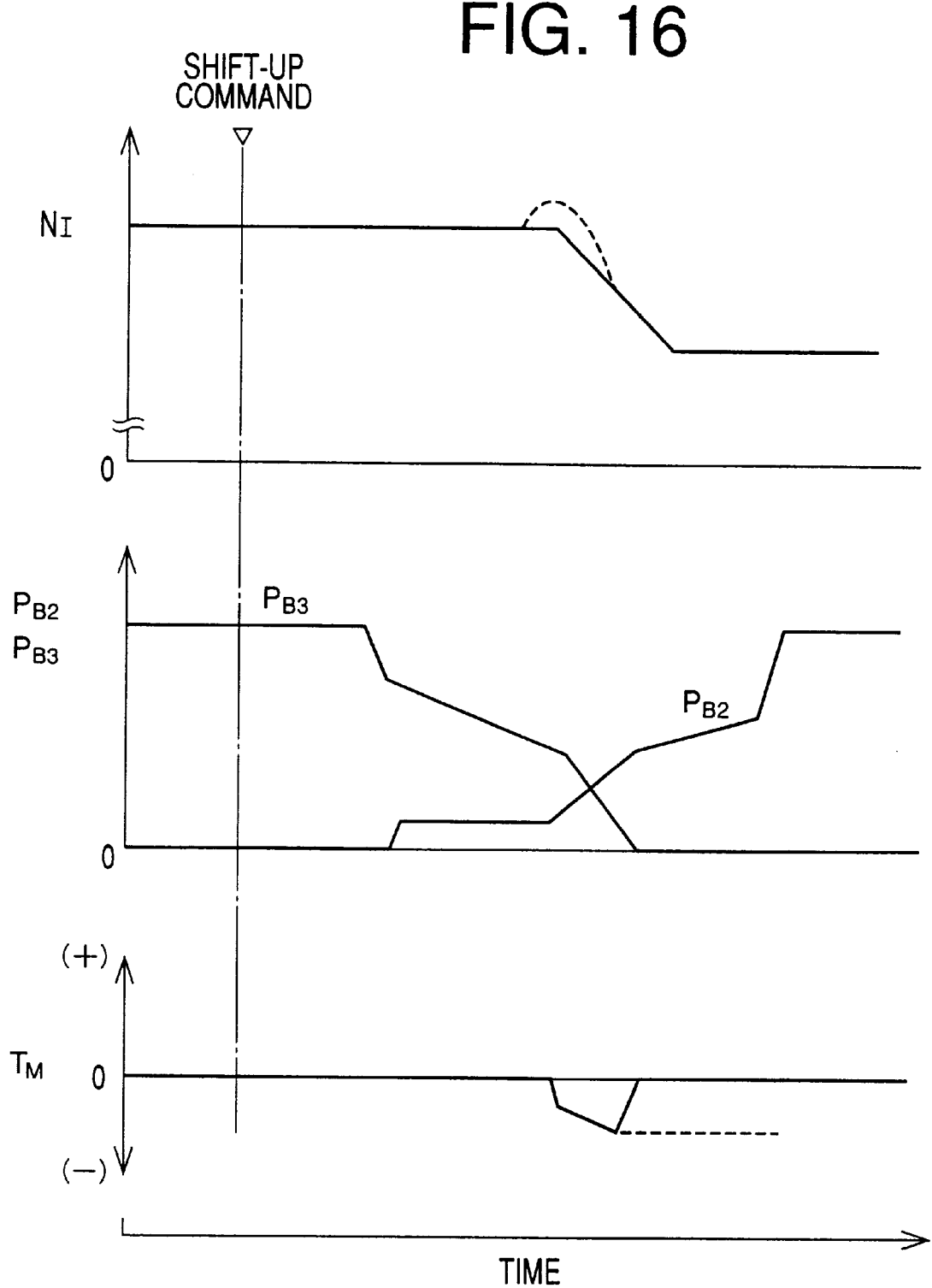
FIG. 16 is a time chart for explaining an example of changes of the parameters according to the routine of FIG. 15.

The routine of FIG. 15 is initiated with step SC1 to determine whether the automatic transmission 18 should be shifted up from the second-speed position "2nd" to the third-speed position "3rd". The 2-3 shift-up action is achieved by engaging the brake B2 while releasing the brake B3, as indicated in FIG. 3. If the clutch-to-clutch 2-3 shift-up action of the automatic transmission 18 should take place, that is, if an affirmative decision (YES) is obtained in step SC1, the control flow goes to step SC2 in which a 2-3 shift-up command is generated a predetermined time after the affirmative decision is obtained in step SC1, so that the solenoid valves SL1–SL4 are selectively energized or de-energized so as to initiate the 2-3 shift-up action. Further, the second clutch CE2 is engaged. Then, the control flow goes to step SC3 to determine whether the speed $N_I$ of the input shaft 19 of the automatic transmission 18 has an overshoot, namely, an abrupt increase. This determination may be effected by determining whether the rate or amount of change of the input speed $N_I$ is higher or larger than a predetermined threshold. Broken line in the uppermost graph in FIG. 16 indicates an example of overshooting of the input speed $N_I$. If an affirmative decision (YES) is obtained in step SC3, the control flow goes to step SC4 and the following steps to reduce the input torque $T_I$ of the automatic transmission 18. Thus, the present embodiment is adapted to reduce the input torque $T_I$ of the automatic transmission 18 when an overshoot of the input speed $N_I$ takes place during the clutch-to-clutch 2-3. In FIG. 16, "$P_{B2}$" and "$P_{B3}$" represent the hydraulic pressures of the brakes B2 and B3, respectively. The transient pressure $P_{B3}$ during the 2-3 shift-up action is determined by the pilot pressure $P_{SLU}$ generated by the linear solenoid valve SLU.

Step SC4 is provided to determine whether the stored electric energy amount SOC is equal to or larger than the threshold α, that is, whether the input torque $T_I$ can be reduced by controlling the motor/generator 14. If an affirmative decision (YES) is obtained in step SC4, the control flow goes to step SC5 and the following steps. Step SC5 is provided to determine whether the hybrid drive system 10 is placed in the ENGINE DRIVE mode. If an affirmative decision (YES) is obtained in step SC5, the control flow goes to step SC6 to give a reverse rotation torque to the motor/generator 14 to thereby reduce the input torque $T_I$. Step SC6 is followed by step SC7 to determine whether the input speed $N_I$ has an overshoot. Step SC6 is repeatedly implemented until a negative decision (NO) is obtained in step SC7, namely, until the overshooting of the input speed $N_I$ is eliminated. Accordingly, the reverse rotation torque of the motor/generator 14 is gradually increased. The lowermost graph in FIG. 16 shows changes of the motor torque $T_M$ by repeated implementation of step SC6. In this graph, solid line indicates the change of the motor torque $T_M$ in the case where the reduction of the motor torque $T_M$ is terminated immediately after the overshooting of the input speed $N_I$ is eliminated, while broken line indicates the change of the motor torque $T_M$ in the case where the reduction of the input torque $T_I$ is continued even during the inertia phase of the 2-3 shift-up action of the automatic transmission 18.

If the negative decision (NO) is obtained in step SC7, the control flow goes to step SC8 to update stored learning compensation data maps which determines the transient pressure $P_{B3}$ of the brake B3, namely, the duty ratio of the linear solenoid valve SLU. The data maps are updated by learning compensation on the basis of the amount of reduction (reduction percent) of the input torque $T_I$ in step SC6.

Described in detail, an amount of change $\Delta P_{SLU}$ of the pilot pressure $P_{SLU}$ for changing the transient pressure $P_{B3}$ is determined according to one of the stored data maps which correspond to steps SC8, SC12, SC16 and SC20 as indicated in FIG. 17. These data maps are updated by learning compensation in different manners in steps SC8, SC12, SC16 and SC20, on the basis of the reduction percent (%) of the input torque $N_I$ in the above-described step SC6 and steps SC10, SC14 and SC18 which will be described. In the next occurrence of the 2-3 shift-up action of the transmission 18, the pilot pressure $P_{SLU}$ is changed by the amount of change $\Delta P_{SLU}$ determined according to the appropriate data map, so as to control the transient pressure $P_{B3}$ for preventing the overshooting of the input speed $N_I$.

The reduction percent (%) of the input torque $T_I$ is a reduction percent with respect to the total torque of the engine 12 and the motor/generator 14. The reduction percent in step SC6 adapted to reduce the input torque $T_I$ by giving a reverse rotation torque $T_M$ to the motor/generator 14 is represented by the reverse rotation torque $T_M$ of the motor/generator 14 divided by the engine torque $T_E$ and multiplied by 100. Steps SC8, SC12, SC16 and SC20 are selectively implemented to update the respective data maps, depending upon the operation mode of the hybrid drive system 10 and the source (engine 12 or motor/generator 14) used for reducing the input torque $T_I$. The stored data maps to be updated correspond to respective different torque reduction modes, namely, respective combinations of the operation modes and the source used for reducing the input torque $T_I$. Each of these data maps represents a relationship between the amount of change $\Delta P_{SLU}$ of the pilot pressure $P_{SLU}$ (amount of change of the duty ratio of the linear solenoid valve SLU), and the vehicle running parameters such as the accelerator pedal operating amount $\theta_{AC}$ and vehicle speed V.

The duty ratio of the linear solenoid valve SLU is controlled change the pilot pressure $P_{SLU}$ by the amount of change $\Delta P_{SLU}$ determined according to the appropriate data map updated in step SC8, in the case where the stored electric energy amount SOC is not smaller than the threshold a while the hybrid drive system 10 is placed in the ENGINE DRIVE mode. The duty ratio of the linear solenoid valve SLU is an example of a physical value which influences the clutch-to-clutch 2-3 shift-up action of the automatic transmission 18. The data maps may include other parameters such as the magnitude and duration of the overshoot of the input speed $N_I$ detected in step SC3.

If a negative decision (NO) is obtained in step SC5, that is, if the hybrid drive system 10 is not placed in the ENGINE DRIVE mode, the control flow goes to step SC9 to determine whether the hybrid drive system 10 is placed in the MOTOR DRIVE mode (operation mode 1). If an affirmative decision (YES) is obtained in step SC9, the control flow goes to steps SC10, SC11 and SC12 to reduce the input torque $T_I$ and update the stored data maps for determining the duty ratio of the linear solenoid valve SLU, as in the ENGINE DRIVE mode (as in steps SC6, SC7 and SC8). In the MOTOR DRIVE mode in which the motor/generator 14 is operated as the drive power source for running the vehicle, however, the input torque $T_I$ is reduced by reducing the motor torque $T_M$ in step SC10. The amount and rate of reduction of the motor torque $T_I$ in step SC10 may be the same as in step SC6, but may be different from those in step SC6, depending upon a difference of the inertia between the motor/generator 14 and the engine 10, for instance.

If a negative decision (NO) is obtained in step SC9, that is, if the hybrid drive system 10 is not placed in the MOTOR DRIVE mode, the control flow goes to step SC13 to determine whether the hybrid drive system 10 is placed in the ENGINE.MOTOR DRIVE mode (operation mode 4). If an affirmative decision (YES) is obtained in step SC13, the control flow goes to step SC14, SC15 and SC16 to reduce the input torque $T_I$ and update the stored data maps, as in the MOTOR DRIVE mode (as in steps SC10, SC11 and SC12). The amount and rate of reduction of the motor torque $T_I$ in step SC14 may be the same as in step SC10, but may be different from those in step SC10, depending upon a difference between the total inertia of the engine 12 and motor/generator 14 and the inertia of the motor/generator 14.

If a negative decision (NO) is obtained in step SC4, that is, if the motor/generator 14 cannot be used to reduce the input torque $T_I$, the control flow goes to step SC17 to determine whether the retard control of the spark advance of the engine 12 is possible. This determination may be effected by determining whether the catalyst temperature is higher than a predetermined threshold and whether the frequency of the spark advance retard control of the engine 12 so far is lower than a predetermined threshold. If the catalyst temperature is lower than the threshold and the frequency is lower than the threshold, it means that the retard control is possible. If an affirmative decision (YES) is obtained in step SC16, the control flow goes to steps SC18, SC19 and SC20 to reduce the input torque $T_I$ by effecting the retard control of the spark advance of the engine 12, and update the appropriate data maps. When the stored electric energy amount SOC is smaller than the threshold α, the motor/generator 14 cannot be used as the drive power source for driving the vehicle, and the hybrid drive system 10 is usually placed in the ENGINE DRIVE mode (Operation mode 2) or ENGINE DRIVE+CHARGING mode (operation mode 3). In this ENGINE DRIVE or ENGINE DRIVE+CHARGING mode, the input torque $T_I$ can be reduced by retarding the spark advance of the engine 12. The amount and rate of reduction of the motor torque $T_I$ in step SC18 may be the same as in step SC6, but may be different from those in step SC6, depending upon differences in the control accuracy and response between the retard control of the spark advance of the engine 12 and the control of the motor torque $T_M$.

If a negative decision (NO) is obtained in step SC17, that is, if neither the engine 12 nor the motor/generator 14 can be used for reducing the input torque $T_I$, the control flow goes to step SC21 to change the duty ratio of the linear solenoid valve SLU for increasing the pilot pressure $P_{SLU}$ so as to increase the transient pressure $P_{B3}$ of the brake B3, so that the releasing action of the brake B3 is delayed to reduce the overshoot tendency of the speed $N_I$ of the input shaft 26 of the automatic transmission 26. The delay of the releasing action of the brake B3 has the substantially same effect as the reduction of the torque $T_I$ of the input shaft 26. Thus, the deterioration of the 2-3 shift-up action of the automatic transmission 18 can be prevented, even when the input torque $T_I$ cannot be reduced.

In the hybrid drive system 10 according to the present fourth embodiment, the control apparatus including the hybrid drive controller 50 and the automatic transmission controller 52 provides: the first torque reducing means corresponding to steps SC18 for reducing the input torque $T_I$ of the automatic transmission 18 by controlling the engine 12; the second torque reducing means corresponding to steps SC6, SC10 and SC14 for reducing the input torque $T_I$ by controlling the motor/generator 14; and the torque reduction mode selecting means corresponding to steps SC4, SC5, SC9, SC13 and SC17 for selectively enabling the first or second torque reducing means to operate, according to the predetermined selecting condition. Since the first and second torque reducing means are provided, the input torque $T_I$ of the automatic transmission 18 can be suitably reduced over a wider variety of running condition of the vehicle, so as to effectively prevent an undesirable overshoot of the input speed $N_I$ of the automatic transmission 18 during the clutch-to-clutch 2-3 shift-up action thereof, than in the arrangement adapted to use only the motor/generator 14 or the engine 12 as the source for reducing the input torque $T_I$.

The present fourth embodiment is also adapted to use the second torque reducing means for controlling the motor/generator 14 so as to reduce the input torque $T_I$, where the motor/generator 14 can be operated for this purpose with the stored electric energy amount SOC being equal to or larger than the threshold α, and to use the first torque reducing means for controlling the engine 12 so as to reduce the input torque $T_I$, where the stored electric energy amount SOC is smaller than the threshold α. In the present arrangement, the input torque $T_I$ can be suitably reduced by retarding the spark advance of the engine 12, even when the motor/generator 14 cannot be used as the source for reducing the input torque $T_I$.

In the fourth embodiment of FIG. 15, steps SC8, SC12, SC16 and SC20 are provided to update the respective data maps used in the respective different torque reduction modes, by learning compensation on the basis of the amount of reduction of the input torque $T_I$ in steps SC6, SC10, SC14 and SC18, so that the amount of change $\Delta P_{SLU}$ of the pilot pressure $P_{SLU}$ of the linear solenoid valve SLU is determined according to the thus updated data maps, to control the transient pressure $P_{B3}$ of the brake B3, in the next occurrence of the 2-3 shift-up action of the automatic transmission 18. This arrangement permits a smooth engaging action of the brake B3, irrespective of the currently established operation mode of the hybrid drive system 10, a difference of the inertia of the drive power source used, and differences of the control accuracy and response of the source used for reducing the input torque $T_I$.

Further, the fourth embodiment is adapted to reduce the input torque $T_I$ by using only the motor/generator 14, even when the hybrid drive system 10 is placed in the ENGINE.MOTOR DRIVE mode (operation mode 4). This arrangement permits easier control of the input torque $T_I$ with high accuracy than the arrangement in which both the engine 12 and the motor/generator 14 are used to reduce the input torque $T_I$.

Figure 18:
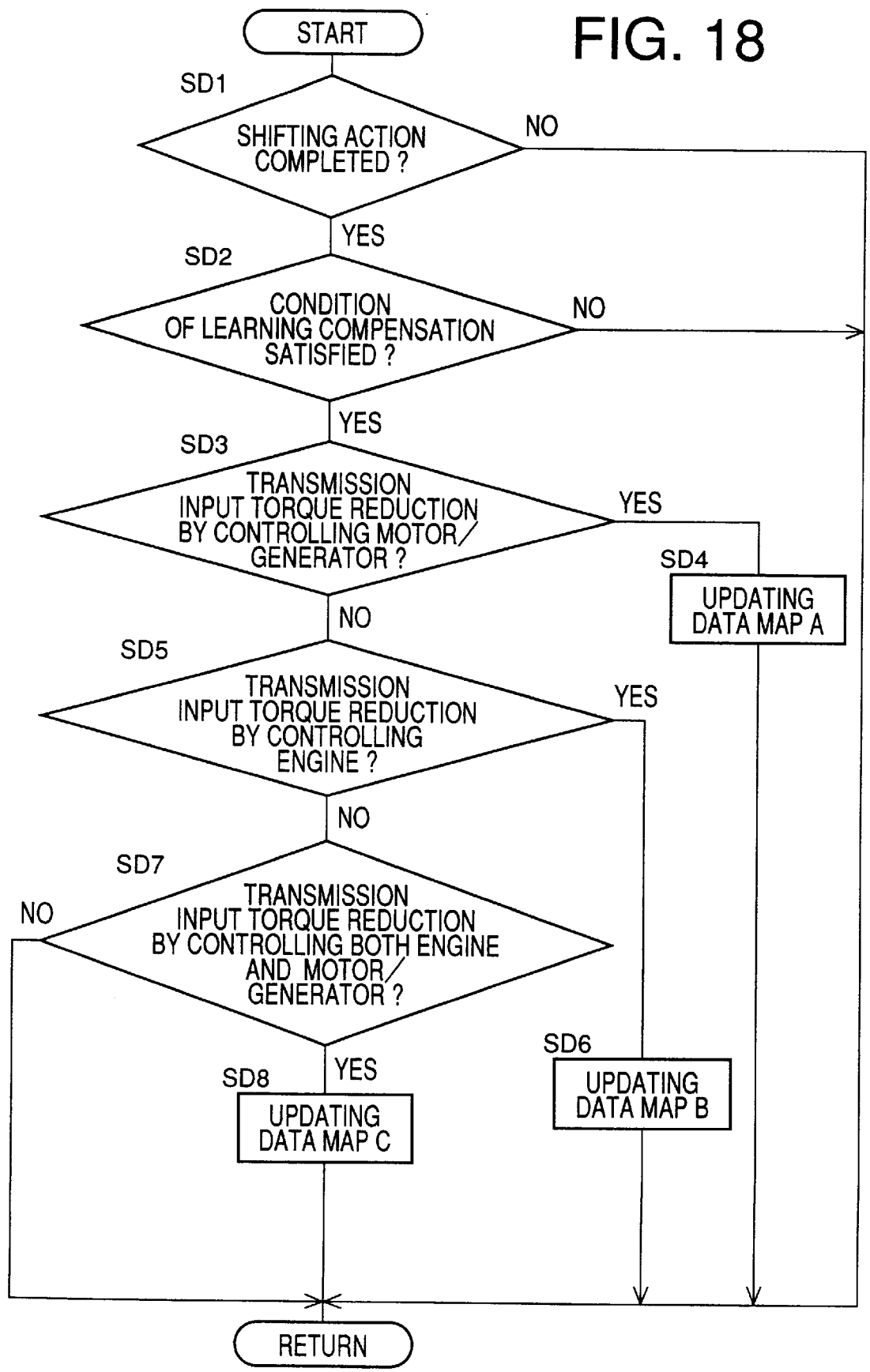
FIG. 18 is a flow chart illustrating a control routine in a yet further embodiment of this invention.

Referring next to the flow chart of FIG. 18, there is shown a fifth embodiment of this invention which uses different data maps in respective different three modes for the reduction of the input torque $T_I$ for determining a physical value which influences a shifting action of the automatic transmission 18. The three torque reduction modes consists of a first mode wherein the first torque reducing means is operated for reducing the input torque $T_I$ by using the engine 12, a second mode wherein the second torque reducing means is operated for reducing the input torque $T_I$ by using the motor/generator 14, and a third mode wherein the first and second torque reducing means are both operated for reducing the input torque $T_I$.

In the present embodiment, the torque reduction mode selecting means enables at least one of the first torque reducing means and the second torque reducing means to operate to reduce the input torque $T_I$, according to the predetermined selecting condition.

The data maps are updated by learning compensation on the basis of various parameters such as: the amount of reduction of the input torque $T_I$ by the feed-forward control of the engine torque $T_E$ and/or the motor torque $T_M$; the amount of reduction of the input torque $T_I$ by the feedback control of the engine torque $T_E$ and/or motor torque $T_M$; the amount of change of the duty ratio of the linear solenoid valve SLN, SLU if this duty ratio per se is controlled; the time duration of the shifting action in question of the automatic transmission 18; and the amount of overshoot of the input speed $N_I$. The data maps to be updated are used to determine a selected physical value which determines the shifting action of the automatic transmission 18. For instance, the physical value is the transient pressure of the frictional coupling device used to achieve the shifting action in question, the duty ratio of the linear solenoid valve SLN, SLU, or the amount of reduction of the input torque $T_I$. The learning compensation of the physical value to update the data maps may be effected as disclosed in JP-A-63-291738 and JP-A-3-37470. However, the present embodiment is characterized by the use of the different data maps for the respective three different torque reduction modes. It will be understood that steps SD4, SD6 and SD8 correspond to the learning compensation means for updating the data maps.

The routine illustrated in the flow chart of FIG. 18 is initiated with step SD1 to determine whether a shifting action of the automatic transmission 18 is completed. This determination may be effected on the basis of changes of the speeds or speeds of a selected part or parts of the automatic transmission 18, and/or the time lapse after the initiation of the shifting action. If an affirmative decision (YES) is obtained in step SD1, the control flow goes to step SD2 to determine whether a predetermined condition for updating the data maps is satisfied. Preferably, different conditions are used for the different torque reduction modes or the different operation modes of the hybrid drive system 10. For instance, the updating of the data maps is permitted or inhibited in the following conditions:

a) The updating of the data maps is inhibited when the oil temperature of the automatic transmission 18 is lower than a predetermined lower limit.

b) When the water temperature of the engine 12 is lower than a predetermined lower limit, the appropriate data map is updated only where the input torque $T_I$ is reduced by controlling the motor/generator 14. However, the updating of the data map is inhibited when the water temperature is extremely low.

c) The updating of the data maps is inhibited when the amount of change of the torque of the drive power source due to a change in the accelerator pedal operating amount during a shifting action of the automatic transmission 18 is larger than a predetermined upper limit.

d) The updating of the data maps is inhibited when the amount of reduction of the input torque $T_I$ changes during a shifting action of the automatic transmission 18, for example, when the input torque $T_I$ cannot be adequately reduced by controlling the motor/generator 14.

If an affirmative decision (YES) is obtained in step SD2, the control flow goes to step SD3 to determine whether the input torque $T_I$ is reduced in the second mode, that is, by controlling the motor/generator 14. If an affirmative decision (YES) is obtained in step SD3, the control flow goes to step SD4 in which the data map A for the second mode is updated, so that the selected physical value is controlled according to the thus updated data map A when the input torque $T_I$ is reduced in the second mode by using the motor/generator 14 in the next occurrence of the same shifting action of the automatic transmission 18. FIG. 19 shows an example of the data map A which represents a relationship between the input torque $T_I$ of the automatic transmission 18 and the amount of change or compensation $\Delta P$ of the transient pressure P of the appropriate frictional coupling device during the inertia phase of different ACCELERATOR-ON shift-up actions of the automatic transmission 18 as in the first embodiment.

If a negative decision (NO) is obtained in step SD3, the control flow goes to step SD5 to determine whether the input torque $T_I$ is reduced in the first mode, that is, by controlling the engine 12. If an affirmative decision (YES) is obtained in step SD5, the control flow goes to step SD6 in which the data map B for the first mode is updated, so that the selected physical value is controlled according to the thus updated data map B when the input torque $T_I$ is reduced in the first mode by using the engine 12 in the next occurrence of the same shifting action of the automatic transmission 18. If a negative decision (NO) is obtained in step SD5, the control flow goes to step SD7 to determine the input torque $T_I$ is reduced in the third mode, that is, by controlling both the engine 12 and the motor/generator 14. If an affirmative decision (YES) is obtained in step SD7, the control flow goes to step SD8 in which the data map c for the third mode is updated, so that the selected physical value is controlled according to the thus updated data map C when the input torque $T_I$ is reduced in the third mode by using the engine 12 and the motor/generator 14 in the next occurrence of the same shifting action of the automatic transmission 18.

In the present fifth embodiment, the data maps for determining a physical value influencing a shifting action of the automatic transmission 18 are provided for the respective different torque reduction modes (first, second and third modes). In other words, the data map to be updated is determined depending upon whether the input torque $T_I$ is reduced by using only the motor/generator 14, or only the engine 12, or both the motor/generator 14 and the engine 12. This arrangement permits a smooth shifting action of the automatic transmission, irrespective of the differences of the control accuracy and response in the different torque reduction modes.

Figure 20:
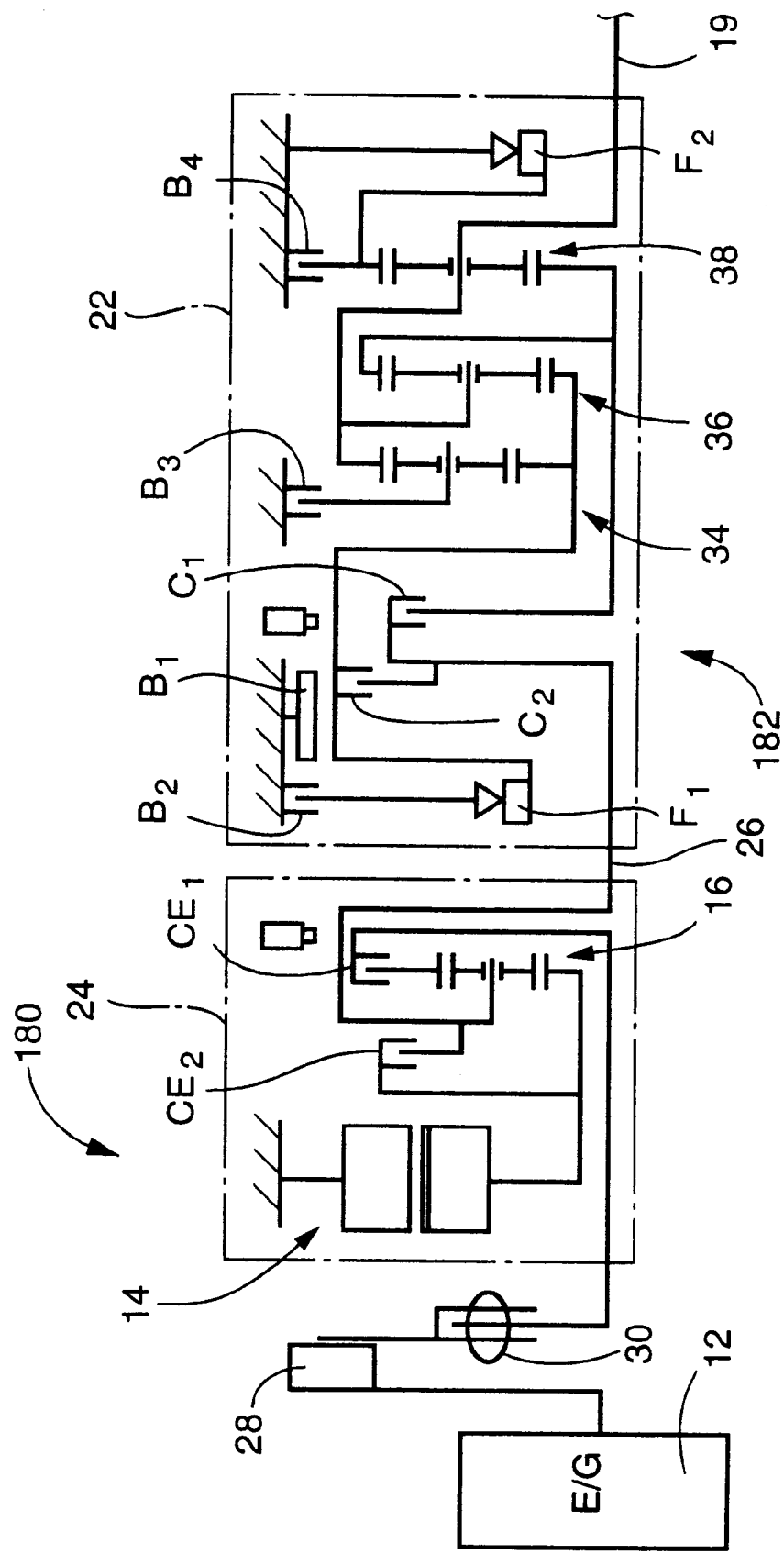
FIG. 20 is a schematic view showing another type of hybrid drive system to which the present invention is applicable.

Although the hybrid drive system 10 of FIG. 1 uses the automatic transmission 18 having one reverse-drive position and five forward-drive positions, the principle of the present invention is equally applicable to a hybrid drive system 180 using an automatic transmission 182 which does not include the auxiliary transmission 20 and employs only the primary transmission 22, as shown in FIG. 20. This automatic transmission 182 has one reverse-drive position and four forward-drive positions, as indicated in FIG. 21.

While the present invention has been described above in its presently preferred embodiments by reference to the accompanying drawings, it is to be understood that the invention may be embodied with various changes, modifications and improvements, which may occur to those skilled in the art, in the light of the foregoing teaching.

What is claimed is:

1. An apparatus for controlling a hybrid drive system of a motor vehicle having an engine operated by combustion of a fuel, a motor/generator, and a transmission disposed between a drive wheel of the vehicle and an assembly of said engine and said motor/generator, said apparatus comprising torque reduction control means for reducing an input torque of said transmission during a shifting action of said transmission, when a predetermined torque reducing condition is satisfied, said apparatus being characterized in that said torque reduction control means comprises:

first torque reducing means for reducing said input torque of said transmission by controlling said engine;

second torque reducing means for reducing said input torque of said transmission by controlling said motor/generator; and torque reduction mode selecting means for enabling at least one of said first and second torque reducing means to operate to reduce said input torque, according to a predetermined selecting condition.

2. An apparatus according to claim 1, wherein said torque reduction control means reduces said input torque of said transmission during an inertia phase of a shift-up action as said shifting action of said transmission.

3. An apparatus according to claim 1, wherein said torque reduction control means reduces said input torque of said transmission during a shift-down action as said shifting action of said transmission.

4. An apparatus according to claim 1, wherein said torque reduction control means reduces said input torque of said transmission upon occurrence of an overshoot of an input speed of said transmission during a clutch-to-clutch shifting action of said transmission which is effected by engaging one of two coupling devices while releasing the other of said two coupling devices.

5. An apparatus according to claim 1, wherein said first torque reducing means reduces said input torque of said transmission by effecting a retard control of spark advance of said engine.

6. An apparatus according to claim 1, wherein said second torque reducing means reduces said input torque of said transmission by one of reducing a forward rotation torque of said motor/generator, giving a reverse rotation torque to said motor/generator, and giving a regenerative braking torque to said motor/generator.

7. An apparatus according to claim 6, wherein said torque reduction mode selecting means enables one of said first torque reducing means and said second torque reducing means to operate, according to said predetermined selecting condition.

8. An apparatus according to claim 1, wherein said torque reduction mode selecting means selects one of a first torque reduction mode wherein said first torque reducing means is enabled to operate, a second torque reduction mode wherein said second torque reducing means is enabled to operate, and a third torque reduction mode in which said first and second torque reducing means are enabled to operate.

9. An apparatus according to claim 1, wherein said torque reduction mode selecting means determines whether each of said engine and said motor/generator is operable to reduce said input torque of said transmission, and selects said at least one of said first and second torque reducing means to be enabled to operate, depending upon whether each of said engine and said motor/generator is operable.

10. An apparatus according to claim 9, wherein said torque reduction mode selecting means determines whether said motor/generator is operable to reduce said input torque of said transmission, said torque reduction mode selecting means enabling said second torque reducing means when said motor/generator is operable, and enabling said first torque reducing means when said motor/generator is not operable.

11. An apparatus according to claim 1, wherein said torque reduction control means determines an amount of reduction of said input torque of said transmission depending upon operating states of said engine and said motor/generator.

12. An apparatus according to claim 11, wherein said torque reduction control means determines said amount of reduction of said input torque depending upon a currently established one of operation modes of said hybrid drive system, said operation modes including a motor drive mode in which said motor/generator is operated as a drive power source for driving the motor vehicle, an engine drive mode in which said engine is operated as said drive power source, and an engine.motor drive mode in which both said engine and said motor/generator are operated as said drive power source.

13. An apparatus according to claim 1, further comprising learning compensation means for effecting learning compensation of a physical value which influences said shifting action of said transmission, said learning compensation means being provided for each of a plurality of torque reduction modes at least one of which is selected by said torque reduction mode selecting means according to said predetermined selecting condition, to enable at least one of said first and second torque reducing means to operate to reduce said input torque of said transmission.

14. An apparatus according to claim 13, wherein said physical value consists of a hydraulic pressure applied to a coupling device for achieving said shifting action of said transmission, said learning compensation means determining said hydraulic pressure as said physical value by learning compensation.

15. An apparatus according to claim 14, wherein said torque reduction control means controls an amount of reduction of said input torque of said transmission in a feedback fashion such that said shifting action is performed so as to meet a predetermined condition, said learning compensation means effecting learning compensation of said hydraulic pressure on the basis of the amount of reduction of said input torque by feedback control by said torque reduction control means.

16. An apparatus according to claim 13, wherein said plurality of torque reduction modes consist of a first torque reduction mode wherein said first torque reducing means is enabled to operate, a second torque reduction mode wherein said second torque reducing means is enabled to operate, and a third torque reduction mode in which said first and second torque reducing means are enabled to operate.

* * * * *